(12) United States Patent
Thompson et al.

(10) Patent No.: US 6,784,237 B2
(45) Date of Patent: Aug. 31, 2004

(54) WATER- AND OIL-REPELLENT, ANTISTATIC COMPOSITION

(75) Inventors: Delton R. Thompson, Woodbury, MN (US); Thomas P. Klun, Lakeland, MN (US); William M. Lamanna, Stillwater, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 69 days.

(21) Appl. No.: 10/458,971

(22) Filed: Jun. 11, 2003

(65) Prior Publication Data

US 2003/0211320 A1 Nov. 13, 2003

Related U.S. Application Data

(62) Division of application No. 09/474,711, filed on Dec. 29, 1999, now Pat. No. 6,592,988.

(51) Int. Cl.[7] .............................. C08L 1/00; D02G 3/00
(52) U.S. Cl. .................. 524/462; 428/375; 428/411.1; 428/421; 428/413; 428/423.1
(58) Field of Search .............................. 428/375, 411.1, 428/500, 413, 423.1, 480, 421; 252/8.81, 8.62, 8.84; 524/462

(56) References Cited

U.S. PATENT DOCUMENTS

| | | | |
|---|---|---|---|
| 2,732,398 A | 1/1956 | Brice et al. | |
| 2,803,656 A | 8/1957 | Ahlbrecht et al. | |
| 3,476,753 A | 11/1969 | Hansen | |
| 3,728,151 A | 4/1973 | Sherman et al. | |
| 3,816,229 A | 6/1974 | Blerbrauber | |
| 3,896,035 A | 7/1975 | Schultz et al. | |
| 3,899,563 A | 8/1975 | Oxenrider et al. | |
| 3,901,727 A | 8/1975 | Laudas | |
| 3,916,053 A | 10/1975 | Sherman et al. | |
| 4,007,150 A | 2/1977 | Adelmann et al. | |
| 4,014,880 A | 3/1977 | Dowd et al. | |
| 4,041,003 A | 8/1977 | Adelmann et al. | |
| 4,043,923 A | 8/1977 | Laudas | |
| 4,043,964 A | 8/1977 | Sherman et al. | |
| 4,144,367 A | 3/1979 | Landucci | |
| 4,219,625 A | 8/1980 | Mares et al. | |
| 4,264,484 A | 4/1981 | Patel | |
| 4,387,222 A | 6/1983 | Koshar | |
| 4,505,997 A | 3/1985 | Armand et al. | |
| 4,582,781 A | 4/1986 | Chen et al. | |
| 4,624,889 A | 11/1986 | Bries | |
| 4,666,764 A | 5/1987 | Kobayashi et al. | |
| 5,025,052 A | 6/1991 | Crater et al. | |
| 5,072,040 A | 12/1991 | Armand | |
| 5,099,026 A | 3/1992 | Crater et al. | |
| 5,136,097 A | 8/1992 | Armand | |
| 5,145,727 A | 9/1992 | Potts et al. | |
| 5,149,576 A | 9/1992 | Potts et al. | |
| 5,176,943 A | 1/1993 | Woo | |
| 5,273,840 A | 12/1993 | Dominey | |
| 5,274,159 A | 12/1993 | Pellerite et al. | |
| 5,300,357 A | 4/1994 | Gardiner | |
| 5,380,778 A | 1/1995 | Buckanin | |
| 5,451,622 A | 9/1995 | Boardman et al. | |
| 5,514,493 A | 5/1996 | Waddell et al. | |
| 5,554,664 A | 9/1996 | Lamanna et al. | |
| 5,560,992 A | 10/1996 | Sargent et al. | |
| 5,681,963 A | 10/1997 | Liss | |
| 5,723,664 A | 3/1998 | Sakaguchi et al. | |
| 5,827,602 A | 10/1998 | Koch et al. | |
| 5,874,616 A | 2/1999 | Howells et al. | |
| 6,592,988 B1 * | 7/2003 | Thompson et al. | ......... 428/375 |

FOREIGN PATENT DOCUMENTS

| | | |
|---|---|---|
| AU | 760642 | 3/2001 |
| EP | 0 613 462 B1 | 1/1996 |
| JP | 3-41160 | 2/1991 |
| JP | 9-323956 | 12/1997 |
| WO | WO 93/10085 | 5/1993 |
| WO | WO 97/22576 | 6/1997 |
| WO | WO 97/22659 | 6/1997 |
| WO | WO 9722660 | 6/1997 |
| WO | WO 99/05345 | 2/1999 |
| WO | WO 01/12713 A1 | 2/2001 |

OTHER PUBLICATIONS

Koshar et al., "Bis(perfluoroalkylsulfonyl)methanes and Related Disulfones", J. Org. Chem., (1973), pp. 3358–3363, vol. 38, No. 19.

Wente, "Superfine Thermoplastic Fibers", Industrial and Engineering Chemistry, (1956), pp. 1342–1346 vol. 48, No. 8.

Wente et al., "Manufacture of Superfine Organic Fibers", Naval Research Laboratories Report No. 4364, (1954).

Organic Synthesis, (1955), pp. 366–367, Collected vol. 3.

* cited by examiner

Primary Examiner—Cynthia H. Kelly
Assistant Examiner—J. M. Gray
(74) Attorney, Agent, or Firm—Lisa P. Fulton; Lucy C. Weiss

(57) ABSTRACT

A water- and oil-repellent, antistatic composition comprises (a) at least one nonpolymeric ionic salt consisting of (i) at least one cation selected from the group consisting of monovalent metal cations, divalent metal cations, and organic onium cations, and (ii) at least one weakly coordinating anion, the conjugate acid of the anion having an acidity greater than or equal to that of a hydrocarbon sulfonic acid, and with the proviso that the anion is organic or fluoroorganic when the cation is a metal; (b) at least one fluorochemical repellency-imparting additive or repellent; and (c) at least one insulating material. The composition exhibits good antistatic and repellency characteristics.

2 Claims, No Drawings

WATER-AND OIL-REPELLENT, ANTISTATIC COMPOSITION

This application is a divisional of U.S. Ser. No. 09/474711, filed Dec. 29, 1999, U.S. Pat. No. 6,592,988, now allowed, the disclosure of which is herein incorporated by reference.

FIELD OF THE INVENTION

This invention relates to compositions that exhibit both repellency and antistatic characteristics. This invention further relates to fibers, films, fabrics, coatings, and molded or blown articles comprising the compositions. In other aspects, this invention also relates to a topical treatment composition and to processes for imparting both repellency and antistatic characteristics to substrates.

BACKGROUND OF THE INVENTION

Various fluorochemicals have been used to impart water and oil repellency, as well as soil resistance, to a variety of substrates (for example, textiles, carpet, leather, paper, and non-woven webs). These fluorochemicals have most often been applied topically (for example, by spraying, padding, or finish bath immersion), but some fluorochemicals have also been useful as polymer melt additives for preparing water- and oil-repellent polymeric fibers, films, fabrics, etc. The resulting repellent substrates have found use in numerous applications where water and/or oil repellency (as well as soil resistance) characteristics have been valued.

For some applications, however, antistatic properties have also been necessary or desirable.

Electrostatic charge buildup is responsible for a variety of problems in the processing and use of many industrial products and materials. Electrostatic charging can cause materials to stick together or to repel one another. This is a particular problem in fiber and textile processing. In addition, static charge buildup can cause objects to attract dirt and dust, thereby decreasing the effectiveness of fluorochemical repellents.

Sudden electrostatic discharges from insulating objects can also be a serious problem. With photographic film, such discharges can cause fogging and the appearance of artifacts. When flammable materials are present (for example, in a surgical environment), a static electric discharge can serve as an ignition source, resulting in fires and/or explosions. Static is a particular problem in the electronics industry, since modern electronic devices are extremely susceptible to permanent damage by static electric discharges.

However, conventional antistats (many of which are humectants that rely on the adsorption and conductivity of water for charge dissipation) have generally not been very effective in combination with fluorochemical repellents. The result of such combination has often been a substantial deterioration (or even elimination) of either antistatic or repellency characteristics (or both), relative to the use of either additive alone.

Furthermore, it has been particularly difficult to combine conventional antistats and fluorochemical repellents in polymer melt processing applications, as, for example, the water associated with humectant antistats vaporizes rapidly at melt processing temperatures. This has resulted in the undesirable formation of bubbles in the polymer and has caused screw slippage in extrusion equipment. Many antistats have also lacked the requisite thermal stability, leading to the production of objectionable odors (for example, in melt blowing applications, where high extrusion temperatures are involved).

Thus, there remains a need in the art for antistatic agents and repellents that can be effectively combined to impart both good antistatic characteristics and good repellency characteristics to substrates and that, in particular, can be utilized as melt additives without causing processing problems or melt defects.

SUMMARY OF THE INVENTION

Briefly, in one aspect, this invention provides a water- and oil-repellent, antistatic composition comprising (a) at least one nonpolymeric ionic salt consisting of (i) at least one monovalent metal cation, divalent metal cation, or organic onium cation (for example, a quaternary ammonium ion) and (ii) at least one weakly coordinating anion, the conjugate acid of the anion having an acidity greater than or equal to that of a hydrocarbon sulfonic acid (for example, a bis(perfluoroalkanesulfonyl)imide ion), and with the proviso that the anion is organic or fluoroorganic when the cation is a metal; (b) at least one fluorochemical repellency-imparting additive or repellent; and (c) at least one insulating material. As used herein, the term "organic onium cation" means a positively charged organic ion having at least part of its charge localized on at least one heteroatom (for example, nitrogen, phosphorus, sulfur, iodine, or oxygen). Preferably, the insulating material is a thermoplastic or thermosetting polymer (more preferably, thermoplastic), and the composition is prepared by forming a blend (more preferably, a melt blend) of the components.

It has been discovered that the above-described class of ionic salt antistatic agents or antistats can be effectively combined with fluorochemical repellents to impart both good antistatic characteristics and good repellency characteristics to a variety of insulating materials. The antistats and repellents can be combined not only in topical treatments (external additives) but even (and preferably) as melt additives (internal additives) without causing processing problems or melt defects. The antistat/repellent combination used in the composition of the invention is surprisingly effective at dissipating the static charge that can accumulate in an otherwise insulating substrate such as a polymer film or fabric, while also imparting durable water and oil repellency (and soil resistance). Even more suprisingly, when used in topical treatments or as polymer melt additives in polypropylene melt-blown nonwoven fabric, certain preferred antistats exhibit synergistic behavior when combined with the repellent(s), in that better static dissipation rates are obtained than when the antistats are used alone.

The combination of ionic salt antistat(s) and fluorochemical repellent(s) used in the composition of the invention is compatible with a variety of polymers. Since many of the antistats are hydrophobic (immiscible with water), the antistatic performance of the combination is often relatively independent of atmospheric humidity levels and durable even under exposure to aqueous environments. In addition, since many of the antistats are stable at temperatures up to 300–500° C., the combination of such antistat(s) with thermally stable fluorochemical repellent(s) is particularly well-suited for use in high temperature polymer melt additive applications and in applications where the use temperatures are very high.

The combination of ionic salt antistat(s) and fluorochemical repellent(s) used in the composition of the invention therefore meets the need in the art for antistatic agents and repellents that can be effectively combined to impart both good antistatic characteristics and good repellency characteristics to substrates and that, in particular, can be utilized as melt additives without causing processing problems or melt defects.

In other aspects, this invention also provides fiber, fabric, film, a coating, and a molded or blown article comprising the composition of the invention; processes for imparting both repellency and antistatic characteristics to a substrate, for example, by bulk addition or by topical treatment; and a topical treatment composition comprising (a) at least one nonpolymeric ionic salt consisting of (i) at least one monovalent metal cation, divalent metal cation, or organic onium cation and (ii) at least one weakly coordinating anion, the conjugate acid of the anion having an acidity greater than or equal to that of a hydrocarbon sulfonic acid, and with the proviso that the anion is organic or fluoroorganic when the cation is a metal, and (b) at least one fluorochemical repellency-imparting additive or repellent.

DETAILED DESCRIPTION OF THE INVENTION

Antistats

Ionic salts suitable for use as antistats in the composition of the invention are those that consist of a monovalent or divalent metal cation (preferably, monovalent) or an organic onium cation (preferably, an organic onium cation) and a weakly coordinating anion. Suitable metal cations include, for example, lithium, calcium, sodium, potassium, magnesium, zinc, iron, nickel, and copper, with sodium and lithium being preferred. The organic onium cation can comprise a heteroatom (for example, nitrogen, phosphorus, sulfur, iodine, or oxygen; preferably, nitrogen or phosphorus; more preferably, nitrogen) as the charge center or as a component element in a charge-delocalized chain or ring structure. The organic onium cation can be cyclic (that is, where the charge center(s) of the cation are ring atoms) or acyclic (that is, where the charge center(s) of the cation are not ring atoms but can have cyclic substituents). The cyclic cations can be aromatic, unsaturated but nonaromatic, or saturated, and the acyclic cations can be saturated or unsaturated.

The cyclic cations can contain one or more ring heteroatoms (for example, nitrogen, oxygen, or sulfur), and the ring atoms can bear substituents (for example, hydrogen, halogen, or organic groups such as alkyl, alicyclic, aryl, alkalicyclic, alkaryl, alicyclicalkyl, aralkyl, aralicyclic, and alicyclicaryl groups). Separate alkyl substituents can be joined together to constitute a unitary alkylene radical of from 2 to 4 carbon atoms forming a ring structure. Organic substituents can contain one or more heteroatoms such as, for example, nitrogen, oxygen, sulfur, phosphorus, or halogen (and thus can be fluoroorganic in nature).

The acyclic cations can have at least one (preferably, at least two; more preferably, at least three; most preferably, four) charge center-bonded organic substituents or R groups, with the remaining substituents being hydrogen. The R groups can be cyclic or acyclic, saturated or unsaturated, aromatic or nonaromatic, and can contain one or more heteroatoms such as, for example, nitrogen, oxygen, sulfur, phosphorus, or halogen (and thus can be fluoroorganic in nature).

Preferably, the organic onium cation is acyclic or unsaturated cyclic. More preferably, it is acyclic or aromatic, most preferably, acyclic.

Preferred acyclic organic onium cations are nitrogen onium (ammonium) and phosphorus onium (phosphonium) cations that are quaternary or tertiary (most preferably, quaternary) cations. The quaternary and tertiary cations are preferably of low symmetry (having at least two, preferably at least three, different charge center-bonded organic substituents or R groups as defined above) and more preferably contain at least one hydroxyl group in at least one charge center-bonded organic substituent. Most preferred acyclic organic onium cations are the nitrogen onium cations described below for the ionic salt antistats of Formula I.

Preferred aromatic organic onium cations are the nitrogen onium cations selected from the group consisting of

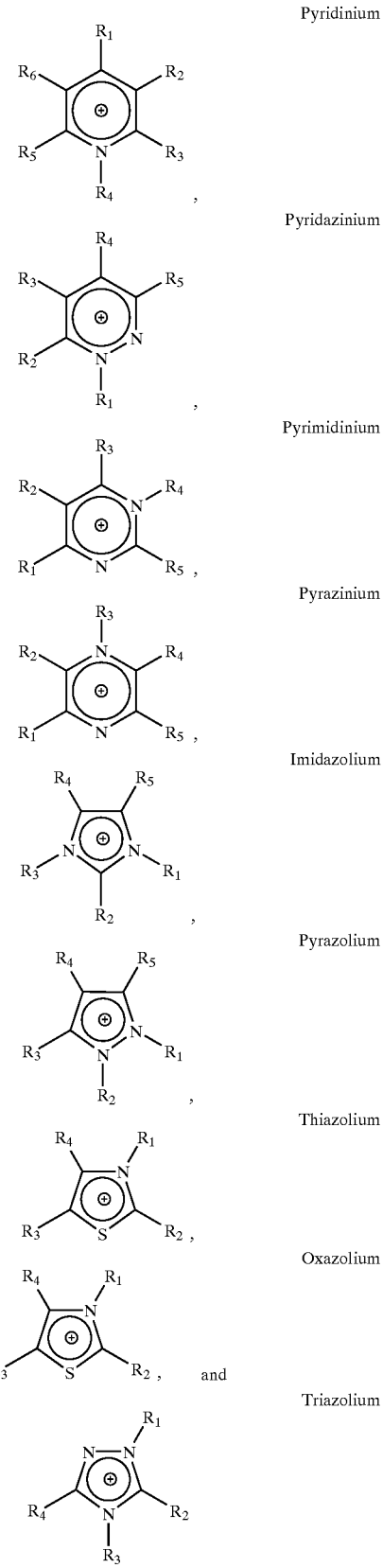

wherein $R_1$, $R_2$, $R_3$, $R_4$, $R_5$, and $R_6$ are independently selected from the group consisting of H, F, alkyl groups of from 1 to about 18 carbon atoms (preferably, from 1 to about 11 carbon atoms), two said alkyl groups joined together to form a unitary alkylene radical of from 2 to 4 carbon atoms forming a ring structure, and phenyl groups; and wherein said alkyl groups, alkylene radicals, or phenyl groups can comprise one or more substituent groups (preferably, a group that is capable of hydrogen bonding, for example, an amino, hydroxyl, acetyl, or acetamide group, or an electron-withdrawing group, for example, F—, Cl—, $CF_3$—, $SF_5$—, $CF_3S$—, $(CF_3)_2CHS$—, and $(CF_3)_3CS$—).

Preferred unsaturated cyclic, nonaromatic organic onium cations include the nitrogen onium cations represented by the following formula

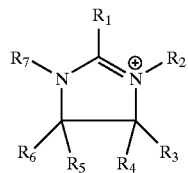

where $R_1$, $R_2$, $R_3$, $R_4$, $R_5$, $R_6$, and $R_7$ are defined as $R_1$, $R_2$, $R_3$, $R_4$, $R_5$, and $R_6$ are defined above for the preferred aromatic organic onium cations.

Suitable weakly coordinating anions have a conjugate acid that is at least as acidic as a hydrocarbon sulfonic acid (preferably, a hydrocarbon sulfonic acid having from 1 to about 20 carbon atoms; more preferably, an alkane, aryl, or alkaryl sulfonic acid having from 1 to about 8 carbon atoms; even more preferably, methane or p-toluene sulfonic acid; most preferably, p-toluene sulfonic acid). Preferably, the conjugate acid is a strong acid. More preferably, the Hammett acidity function, $H_0$, of the neat conjugate acid of the anion is less than about −7 (most preferably, less than about −10).

Representative examples of suitable weakly coordinating anions include $BF_4$—; $PF_6$—; $SbF_6$—; $AsF_6$—; $ClO_4$—; $NO_3$—; Cl—; Br—; F—; $HSO_4$—; $H_2PO_4$—; organic anions such as alkane, aryl, and alkaryl sulfonates; fluorinated and unfluorinated tetraarylborates; carboranes and halogen-, alkyl-, or haloakyl-substituted carborane anions including metallocarborane anions; teflates (for example, $^-OTeF_5$, $^-B(OTeF_5)_4$, and $^-Pd(OTeF_5)_4$); and fluoroorganic anions such as perfluoroalkanesulfonates, cyanoperfluoroalkanesulfonylamides, bis(cyano)perfluoroalkanesulfonylmethides, bis(perfluoroalkanesul- fonyl)imides, bis(perfluoroalkanesulfonyl)methides, and tris(perfluoroalkanesulfonyl)methides; and the like. Preferred anions include organic and fluoroorganic anions (more preferably, alkane, aryl, and alkaryl sulfonates, as well as perfluoroalkanesulfonates, bis(perfluoroalkanesulfonyl) imides, and tris(perfluoroalkanesulfonyl)methides; most preferably, alkane sulfonates, perfluoroalkanesulfonates, and bis(perfluoroalkanesulfonyl)imides).

The fluoroorganic anions can be either fully fluorinated, that is perfluorinated, or partially fluorinated (within the organic portion thereof). Preferred fluoroorganic anions include those that comprise at least one highly fluorinated alkanesulfonyl group, that is, a perfluoroalkanesulfonyl group or a partially fluorinated alkanesulfonyl group wherein all non-fluorine carbon-bonded substituents are bonded to carbon atoms other than the carbon atom that is directly bonded to the sulfonyl group (preferably, all non-fluorine carbon-bonded substituents are bonded to carbon atoms that are more than two carbon atoms away from the sulfonyl group).

Preferably, the fluoroorganic anion is at least about 80 percent fluorinated (that is, at least about 80 percent of the carbon-bonded substituents of the anion are fluorine atoms). More preferably, the anion is perfluorinated (that is, fully fluorinated, where all of the carbon-bonded substituents are fluorine atoms). The anions, including the preferred perfluorinated anions, can contain one or more. catenary (that is, in-chain) heteroatoms such as, for example, nitrogen, oxygen, or sulfur.

Preferred fluoroorganic anions include perfluoroalkanesulfonates, bis(perfluoroalkanesulfonyl) imides, and tris(perfluoroalkanesulfonyl)methides. The perfluoroalkanesulfonates and bis(perfluoroalkanesulfonyl) imides are more preferred anions, with the perfluoroalkanesulfonates being most preferred.

The ionic salt antistats can be solids or liquids under use conditions but preferably have melting points less than about 150° C. (more preferably, less than about 50° C.; most preferably, less than about 25° C.). Liquid ionic salts are preferred due to their generally better static dissipative performance. For use as polymer melt additives, the ionic salt antistats are preferably stable at temperatures of about 250° C. and above (more preferably, about 300° C. and above) and are preferably miscible with the insulating material at the melt processing temperature. (In other words, the onset of decomposition of the antistats is above such temperatures.) Preferred ionic salt antistats for polymer melt additive applications include those having cations selected from the group consisting of alkyl phosphonium cations, aromatic nitrogen onium cations (preferably, the preferred aromatic organic onium cations set forth above), and acyclic nitrogen onium cations (preferably, the cations shown in Formula I below); and having organic or fluoroorganic anions (preferably, anions selected from the group consisting of alkane sulfonates, aryl sulfonates, alkaryl sulfonates, perfluoroalkanesulfonates, bis(perfluoroalkanesulfonyl) imides, and tris(perfluoroalkanesulfonyl)methides; more preferably, alkane sulfonates, perfluoroalkanesulfonates, and bis(perfluoroalkanesulfonyl)imides); most preferably, perfluoroalkanesulfonates and bis(perfluoroalkanesulfonyl) imides.

The antistats are also preferably hydrophobic. Thus, a preferred class of ionic salt antistats for use in the composition of the invention includes those that consist of (a) an aromatic nitrogen onium cation selected from the group consisting of

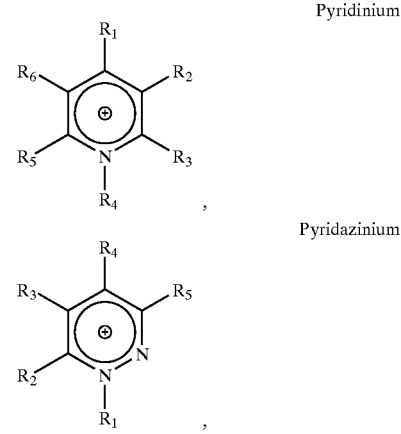

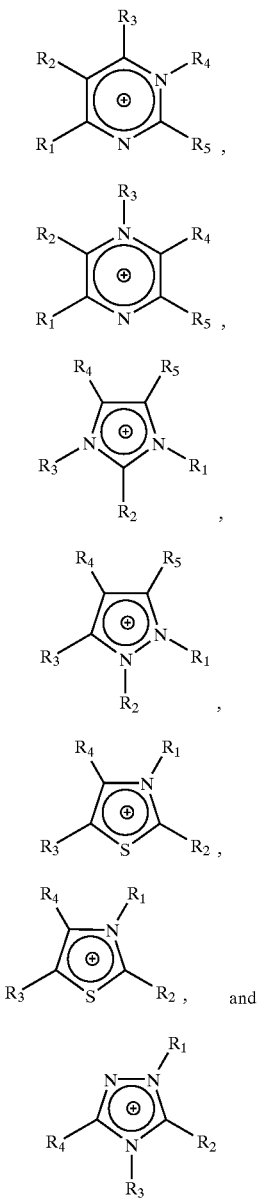

wherein $R_1$, $R_2$, $R_3$, $R_4$, $R_5$, and $R_6$ are independently selected from the group consisting of H, F, alkyl groups of from 1 to about 18 carbon atoms (preferably, from 1 to about 11 carbon atoms), two said alkyl groups joined together to form a unitary alkylene radical of from 2 to 4 carbon atoms forming a ring structure, and phenyl groups; and wherein said alkyl groups, alkylene radicals, or phenyl groups can comprise one or more substituent groups (preferably, an electron-withdrawing group, for example, F—, Cl—, $CF_3$—, $SF_5$—, $CF_3S$—, $(CF_3)_2CHS$—, and $(CF_3)_3CS$—); and (b) a weakly coordinating fluoroorganic anion in accordance with the above description or a weakly coordinating anion selected from the group consisting of $BF_4^-$, $PF_6^-$, $AsF_6^-$, and $SbF_6^-$. This preferred class comprises a most preferred subclass of the hydrophobic ionic liquids described in U.S. Pat. No. 5,827,602 (Koch et al.), the description of the members of which is incorporated herein by reference.

Another preferred class of ionic salt antistats useful in preparing the composition of the invention is the class of compounds represented by Formula I below $$(R_1)_{4-z}N^+[(CH_2)_qOR_2]_z \; X^- \qquad (I)$$

wherein each $R_1$ is independently selected from the group consisting of alkyl, alicyclic, aryl, alkalicyclic, alkaryl, alicyclicalkyl, aralkyl, aralicyclic, and alicyclicaryl moieties that can contain one or more heteroatoms such as, for example, nitrogen, oxygen, sulfur, phosphorus, or halogen (and thus can be fluoroorganic in nature); each $R_2$ is independently selected from the group consisting of hydrogen and the moieties described above for $R_1$; z is an integer of 1 to 4; q is an integer of 1 to 4; and $X^-$ is a weakly coordinating alkane sulfonate, aryl sulfonate, alkaryl sulfonate, or fluoroorganic anion as described above (preferably, a fluoroorganic anion). $R_1$ is preferably alkyl, and $R_2$ is preferably selected from the group consisting of hydrogen, alkyl, and acyl (more preferably, hydrogen or acyl; most preferably, hydrogen). Most preferably, z is 1, q is 2, $R_1$ is alkyl, and $R_2$ is hydrogen.

Many of the above-described ionic salt antistats (for example, metal bis(perfluoroalkanesulfonyl)imides, metal perfluoroalkanesulfonates, onium halides, onium alkanesulfonates, onium arylsulfonates, onium tetrafluoroborates, and onium hexafluorophosphates) are commercially available and can also be prepared by standard methods known in the art. Other ionic salt antistats comprising an organic onium cation can be prepared by ion exchange or metathesis reactions, which are also well known in the art. For example, a precursor onium salt can be combined with a precursor metal salt or the corresponding acid of a weakly coordinating anion in aqueous solution. Upon combining, the desired product (the onium salt of the weakly coordinating anion) precipitates (as a liquid or solid) or can be preferentially extracted into an organic solvent (for example, methylene chloride). The product can be isolated by filtration or by liquid/liquid phase separation, can be washed with water to completely remove byproduct metal salt or acid (if present), and can then be dried thoroughly under vacuum to remove all volatiles (including water and organic solvent, if present). Similar metathesis reactions can be conducted in organic solvents (for example, acetonitrile) rather than in water, and, in this case, the salt byproduct generally preferentially precipitates, while the desired product salt remains dissolved in the organic solvent (from which it can be isolated using standard experimental techniques).

Weakly coordinating fluoroorganic anions (for use in preparing such ionic salts) can be prepared by standard methods known in the art, and metal salts of many are commercially available. Such methods include the anion precursor preparative methods described in the following references, the descriptions of which are incorporated herein by reference: imide precursors—U.S. Pat. Nos. 5,874,616 (Howells et al.), U.S. Pat. No. 5,723,664 (Sakaguchi et al.), U.S. Pat. No. 5,072,040 (Armand), and U.S. Pat. No. 4,387,222 (Koshar); methide precursors—U.S. Pat. No. 5,554,664 (Lamanna et al.) and U.S. Pat. No. 5,273,840 (Dominey); sulfonate precursors—U.S. Pat. No. 5,176,943 (Wou), U.S. Pat. No. 4,582,781 (Chen et al.), U.S. Pat. No. 3,476,753 (Hanson), and U.S. Pat. No. 2,732,398 (Brice et al.); sulfonate, imide, and methide precursors having caternary oxygen or nitrogen in a fluorochemical group—U.S. Pat. No. 5,514,493 (Waddell et al.); disulfone precursors—R. J. Koshar and R. A. Mitsch, J. Org. Chem., 38, 3358 (1973) and U.S. Pat. No. 5,136,097 (Armand).

In general, cyano-containing methides and amides containing fluoroalkanesulfonyl groups can be prepared by the reaction of fluoroalkanesulfonyl fluorides, $R_fSO_2F$, with anhydrous malononitrile or cyanamide, respectively, in the presence of a non-nucleophilic base. This synthetic procedure is described in Scheme 1 of U.S. Pat. No. 5,874,616 (Howells et al.) for the preparation of bis(fluoroalkanesulfonyl)imides (the description of which is incorporated herein by reference) and involves the substitution of either malononitrile or cyanamide for the fluoroalkanesulfonamide. The resulting intermediate non-nucleophilic base cation-containing methide or amide salt can be converted to the desired cation salt (typically lithium) via standard metathesis reactions well known in the art.

Representative examples of useful ionic salt antistats include octyldimethyl-2-hydroxyethylammonium bis(trifluoromethylsulfonyl)imide: $[C_8H_{17}N^+(CH_3)_2 CH_2CH_2OH\ ^-N(SO_2CF_3)_2]$, octyldimethyl-2-hydroxyethylammonium perfluorobutanesulfonate: $[C_8H_{17}H^+(CH_3)_2 CH_2CH_2OH\ ^-OSO_2C_4F_9]$, octyldimethyl-2-hydroxyethylammonium trifluoromethanesulfonate: $[C_8H_{17}H^+(CH_3)_2 CH_2CH_2OH\ ^-OSO_2CF_3]$, octyldimethyl-2-hydroxyethylammonium tris(trifluoromethanesulfonyl)methide: $[C_8H_{17}N^+(CH_3)_2CH_2CH_2OH\ ^-C(SO_2CF_3)_3]$, trimethyl-2-acetoxyethylammonium bis(trifluoromethylsulfonyl)imide: $[(CH_3)_3N^+CH_2CH_2OC(O)CH3\ ^-N(SO_2CF_3)_2]$, trimethyl-2-hydroxyethylammonium bis(perfluorobutanesulfonyl)imide: $[(CH_3)_3N^+CH_2CH_2OH\ ^-N(SO_2C_4F_9)_2]$, triethylammonium bis(perfluoroethanesulfonyl)imide: $[Et_3N^+H\ ^-N(SO_2C_2F_5)_2]$, tetraethylammonium trifluoromethanesulfonate: $[CF_3SO_3^{-+}NEt_4]$, tetraethylammonium bis(trifluoromethanesulfonyl)imide: $[(CF_3SO_2)_2N^{-+}NEt_4]$, tetramethylammonium tris(trifluoromethanesulfonyl)methide: $[(CH_3)_4N^{+-}C(SO_2CF_3)_3]$, tetrabutylammonium bis(trifluoromethanesulfonyl)imide: $[(C_4H_9)_4N^{+-}N(SO_2CF_3)_2]$, trimethyl-3-perfluorooctylsulfonamidopropylammonium bis(trifluoromethanesulfonyl)imide: $[C_8F_{17}SO_2NH(CH_2)_3N^+(CH_3)_3\ ^-N(SO_2CF_3)_2]$, 1-hexadecylpyridinium bis(perfluoroethanesulfonyl)imide: $[n-C_{16}H_{33}-cyc-N^+C_5H_5\ ^-N(SO_2C_2F_5)_2]$, 1-hexadecylpyridinium perfluorobutanesulfonate: $[n-C_{16}H_{33}-cyc-N^+C_5H_5\ ^-OSO_2C_4F_9]$, 1-hexadecylpyridinium perfluorooctanesulfonate: $[n-C_{16}H_{33}-cyc-N^+C_5H_5\ ^-OSO_2C_8F_{17}]$, n-butylpyridinium bis(trifluoromethanesulfonyl)imide: $[n-C_4H_9-cyc-N^+C_5H_5\ ^-N(SO_2CF_3)_2]$, n-butylpyridinium perfluorobutanesulfonate: $[n-C_4H_9-cyc-N^+C_5H_5\ ^-OSO_2C_4F_9]$, 1,3-ethylmethylimidazolium bis(trifluoromethanesulfonyl)imide: $[CH_3-cyc-(N^+C_2H_2NCH)CH_2CH_3\ ^-N(SO_2CF_3)_2]$, 1,3-ethylmethylimidazolium nonafluorobutanesulfonate: $[CH_3-cyc-(N^+C_2H_2NCH)CH_2CH_3\ ^-OSO_2C_4F_9]$, 1,3-ethylmethylimidazolium trifluoromethanesulfonate: $[CH_3-cyc-(N^+C_2H_2NCH)CH_2CH_3\ ^-OSO_2CF_3]$, 1,3-ethylmethylimidazolium hexafluorophosphate: $[CH_3-cyc-(N^+C_2H_2NCH)CH_2CH_3\ PF_6^-]$, 1,3-ethylmethylimidazolium tetrafluoroborate: $[CH_3-cyc-(N^+C_2H_2NCH)CH_2CH_3\ BF_4^-]$, lithium perfluorobutanesulfonate: $[Li^{+-}OSO_2C_4F_9]$, lithium trifluoromethanesulfonate: $[Li^{+-}OSO_2CF_3]$, lithium bis(trifluoromethanesulfonyl)imide: $[Li^{+-}N(SO_2CF_3)_2]$, lithium tris(trifluoromethanesulfonyl)methide: $[Li^{+-}C(SO_2CF_3)_3]$, sodium phenylbis(trifluoromethanesulfonyl)methide: $[Na^{+-}C(C_6H_5)(SO_2CF_3)_2]$, octyldimethyl-2-hydroxyethylammonium teflate: $[C_8H_{17}N^+(CH_3)_2CH_2CH_2OH\ ^-OTeF_5]$, lithium permethylmonocarba-closo-dodecaborate: $[Li^{+-}CB_{11}(CH_3)_{12}]$, sodium monocarba-closo-dodecaborate: $[Na^{+-}CB_{11}H_{12}]$, sodium tetrakis-(pentafluorophenyl)borate: $[Na^{+-}B(C_6F_5)_4]$, octyldimethyl-2-hydroxyethylammonium methanesulfonate: $[C_8H_{17}N^+(CH_3)_2CH_2CH_2OH\ ^-OSO_2CH_3]$, tetrabutylphosphonium perfluorobutanesulfonate: $[(C_4H_9)_4P^{+-}OSO_2C_4F_9]$, tetraphenylphosphonium bis(trifluoromethanesulfonyl)imide: $[(C_6H_5)_4P^{+-}N(SO_2CF_3)_2]$, trioctylmethylammonium chloride: $[(C_8H_{17})_3(CH_3)N^+\ Cl^-]$, trioctylmethylammonium trifluoromethanesulfonate: $[(C_8H_{17})_3(CH_3)N^{+-}OSO_2CF_3]$, trioctylmethylammonium perfluorobutanesulfonate: $[(C_8H_{17})_3(CH_3)N^{+-}OSO_2C_4F_9]$, 3-(2-hydroxyethyl)-1-methyl-2-undecylimidazolinium p-toluenesulfonate: $[CH_3-cyc-(N^+C_2H_4N(CH_2CH_2OH)C)C_{11}H_{23}\ ^-OSO_2C_6H_4CH_3]$, 1-dodecyl-2-ethyl-3-(2-hydroxyethyl)imidazolinium p-toluenesulfonate: $[C_{12}H_{25}-cyc-(N^+C_2H_4N(CH_2CH_2OH)C)C_2H_5\ ^-OSO_2C_6H_4CH_3]$, 1,2-dimethyl-3-propylimidazol- ium bis(trifluoromethanesulfonyl)imide, 1,2-dimethyl-3-propylimidazolium tris(trifluoromethanesulfonyl)methide, 1,2-dimethyl-3-propylimidazolium trifluoromethanesulfonyl perfluorobutanesulfonylimide, 1-ethyl-3-methylimidazolium cyanotrifluoromethanesulfonylamide, 1-ethyl-3-methylimidazolium bis(cyano)trifluoromethanesulfonylmethide, 1-ethyl-3-methylimidazolium trifluoromethanesulfonylperfluorobutanesulfonylimide, octyldimethyl-2-hydroxyethylammonium trifluoromethylsulfonylperfluorobutanesulfonylimide, 2-hydroxyethyltrimethylammonium trifluoromethylsulfonylperfluorobutanesulfonylimide, 2-methoxyethyltrimethylammonium bis(trifluoromethanesulfonyl)imide octyldimethyl-2-hydroxyethylammonium bis(cyano)trifluoromethanesulfonylmethide, trimethyl-2-acetoxyethylammonium trifluoromethylsulfonylperfluorobutanesulfonylimide, 1-butylpyridinium trifluoromethylsulfonylperfluorobutanesulfonylimide, 2-ethoxyethyltrimethylammonium trifluoromethanesulfonate, 1-butyl-3-methylimidazolium perfluorobutanesulfonate, perfluoro-1-ethyl-3-methylimidazolium bis(trifluoromethanesulfonyl)imide, 1-ethyl-2-methylpyrazolium perfluorobutanesulfonate, 1-butyl-2-ethylpyrazolium trifluoromethanesulfonate, N-ethylthiazolium bis(trifluoromethanesulfonyl)imide, N-ethyloxazolium bis(trifluoromethanesulfonyl)imide, and 1-butylpyrimidinium perfluorobutanesulfonylbis(trifluoromethanesulfonyl)-methide, 1,3-ethylmethylimidazolium hexafluorophosphate, 1,3-ethylmethylimidazolium tetrafluoroborate, and mixtures thereof.

Preferred ionic salt antistats include octyldimethyl-2-hydroxyethylammonium bis(trifluoromethylsulfonyl)imide: $[C_8H_{17}N^+(CH_3)_2CH_2CH_2OH\ ^-N(SO_2CF_3)_2]$, octyldimethyl-2-hydroxyethylammonium perfluorobutanesulfonate: $[C_8H_{17}N^+(CH_3)_2Ch_2Ch_2OH\ ^-OSO_2C_4F_9]$, octyldimethyl-2-hydroxyethylammonium trifluoromethanesulfonate: $[C_8H_{17}N^+(CH_3)_2CH_2Ch_2OH\ ^-OSO_2CF_3]$, octyldimethyl-2-hydroxyethylammonium tris(trifluoromethanesulfonyl)methide: $[C_8H_{17}N^+(CH_3)_2CH_2CH_2OH\ ^-C(SO_2CF_3)_3]$, trimethyl-2-acetoxyethylammonium bis(trifluoromethylsulfonyl)imide: $[(CH_3)_3N^+CH_2CH_2OC(O)CH3\ ^-N(SO_2CF_3)_2]$, trimethyl-2-hydroxyethylammonium bis(perfluorobutanesulfonyl)imide: $[(CH_3)_3N^+CH_2CH_2OH\ ^-N(SO_2C_4F_9)_2]$, triethylammonium bis(perfluoroethanesulfonyl)imide: $[Et_3N^+H\ ^-N(SO_2C_2F_5)_2]$, tetraethylammonium trifluoromethanesulfonate: $[CF_3SO_3^{-+}NEt_4]$, tetraethylammonium bis(trifluoromethanesulfonyl)imide: $[(CF_3SO_2)_2N^{-+}NEt_4]$, tetramethylammonium tris(trifluoromethanesulfonyl)methide: $[(CH_3)_4N^{+-}C(SO_2CF_3)_3]$, tetrabutylammonium bis(trifluoromethanesulfonyl)imide: $[(C_4H_9)_4N^{+-}N(SO_2CF_3)_2]$, trimethyl-3-perfluorooctylsulfonamidopropylammonium bis(trifluoromethanesulfonyl)imide: $[C_8F_{17}SO_2NH(CH_2)_3N^+(CH_3)_3\ ^-N(SO_2CF_3)_2]$, 1-hexadecylpyridinium bis(perfluoroethanesulfonyl)imide: $[n-C_{16}H_{33}-cyc-N^+C_5H_5\ ^-N(SO_2C_2F_5)_2]$, 1-hexadecylpyridinium perfluorobutanesulfonate: [n-$C_{16}H_{33}$-cyc-$N^+C_5H_5$ $^-OSO_2C_4F_9$], 1-hexadecylpyridinium perfluorooctanesulfonate: [n-$C_{16}H_{33}$-cyc-$N^+C_5H_5$ $^-OSO_2C_8F_{17}$], n-butylpyridinium bis(trifluoromethanesulfonyl)imide: [n-$C_4H_9$-cyc-$N^+C_5H_5$ $^-N(SO_2CF_3)_2$], n-butylpyridinium perfluorobutanesulfonate: [n-$C_4H_9$-cyc-$N^+C_5H_5$ $^-OSO_2C_4F_9$], 1,3-ethylmethylimidazolium bis(trifluoromethanesulfonyl) imide: [$CH_3$-cyc-($N^+C_2H_2NCH$)$CH_2CH_3$ $^-N(SO_2CF3)_2$], 1,3-ethylmethylimidazolium nonafluorobutanesulfonate: [$CH_3$-cyc-($N^+C_2H_2NCH$)$CH_2CH_3$ $^-OSO_2C_4F_9$], 1,3-ethylmethylimidazolium trifluoromethanesulfonate: [$CH_3$-cyc-($N^+C_2H_2NCH$)$CH_2CH_3$ $^-OSO_2CF_3$], lithium perfluorobutanesulfonate: [$Li^{+-}OSO_2C_4F_9$], lithium trifluoromethanesulfonate: [$Li^{+-}OSO_2CF_3$], lithium bis(trifluoromethanesulfonyl)imide: [$Li^{+-}N(SO_2CF_3)_2$], tetrabutylphosphonium perfluorobutanesulfonate: [$(C_4H_9)_4P^{+-}OSO_2C_4F_9$], octyldimethyl-2-hydroxyethylammonium methanesulfonate: [$C_8H_{17}N^+(CH_3)_2CH_2CH_2OH$ $^-OSO_2CH_3$], 1-dodecyl-2-ethyl-3-(2-hydroxyethyl)imidazolinium p-toluenesulfonate: [$C_{12}H_{25}$-cyc-($N^+C_2H_4N(CH_2CH_2OH)C)C_2H_5$ $^-OSO_2C_6H_4CH_3$], 1,3-ethylmethylimidazolium tetrafluoroborate, and mixtures thereof.

More preferred ionic salt antistats include octyldimethyl-2-hydroxyethylammonium bis(trifluoromethylsulfonyl)imide, octyldimethyl-2-hydroxyethylammonium perfluorobutanesulfonate, octyldimethyl-2-hydroxyethylammonium trifluoromethanesulfonate, triethylammonium bis(perfluoroethanesulfonyl)imide, tetraethylammonium trifluoromethanesulfonate, trimethyl-3-perfluorooctylsulfonamidopropylammonium bis(trifluoromethanesulfonyl)imide, 1,3-ethylmethylimidazolium nonafluorobutanesulfonate, 1,3-ethylmethylimidazolium bis(trifluoromethanesulfonyl)imide, 1,3-ethylmethylimidazolium trifluoromethanesulfonate, tetrabutylphosphonium perfluorobutanesulfonate, and mixtures thereof.

Most preferred ionic salt antistats include octyldimethyl-2-hydroxyethylammonium bis (trifluoromethylsulfonyl)imide, octyldimethyl-2-hydroxyethylammonium trifluoromethanesulfonate, octyldimethyl-2-hydroxyethylammonium nonafluorobutanesulfonate, triethylammonium bis(perfluoroethanesulfonyl)imide, 1,3-ethylmethylimidazolium nonafluorobutanesulfonate, 1,3-ethylmethylimidazolium bis(trifluoromethanesulfonyl)imide, 1,3-ethylmethylimidazolium trifluoromethanesulfonate, tetrabutylphosphonium perfluorobutanesulfonate, and mixtures thereof, with further preferences being in accordance with the general cation and anion preferences set forth above.

Fluorochemical Repellents

Suitable fluorochemical repellency-imparting additives or repellents for use in the composition of the invention are those that comprise at least one fluorochemical group, preferably, at least one fluoroaliphatic or fluoroalicyclic group. Such fluorochemicals include any of the fluorochemical group-containing polymeric and oligomeric compounds known in the art to impart water and oil repellency to substrates. These polymeric and oligomeric fluorochemicals typically comprise one or more fluorochemical groups that contain a perfluorinated carbon chain having from 3 to about 20 carbon atoms, more preferably from about 4 to about 12 carbon atoms. These fluorochemical groups can contain straight chain, branched chain, or cyclic fluorinated alkylene groups or any combination thereof. The fluorochemical groups can optionally contain catenary (i.e., in-chain) heteroatoms such as oxygen, divalent or hexavalent sulfur, or nitrogen. Fully-fluorinated groups are preferred, but hydrogen or chlorine atoms can also be present as substituents, provided that no more than one atom of either is present for every two carbon atoms. It is additionally preferred that any fluorochemical group contain at least about 40% fluorine by weight, more preferably at least about 50% fluorine by weight. The terminal portion of the group is generally fully-fluorinated, preferably containing at least 7 fluorine atoms, e.g., $CF_3CF_2CF_2$—, $(CF_3)_2CF$—, $SF_5CF_2$—. Perfluorinated aliphatic groups (i.e., those of the formula $C_nF_{2n+1}$—) are the most preferred fluorochemical groups.

Representative examples of suitable fluorochemicals include fluorochemical urethanes, ureas and substituted ureas, esters, ethers, alcohols, epoxides, allophanates, amides, amines (and salts thereof), acids (and salts thereof), carbodiimides, guanidines, oxazolidinones, isocyanurates, piperazines, aminoalcohols, sulfones, imides, biurets, acrylate and methacrylate homopolymers and copolymers, siloxanes, alkoxysilanes, chlorosilanes, and mixtures thereof.

Representative fluorochemical group-containing polymers useful in the present invention include fluorochemical acrylate and methacrylate homopolymers or copolymers containing fluorochemical acrylate monomers interpolymerized with monomers such as methyl methacrylate, butyl acrylate, octadecylmethacrylate, acryl ate and meth acryl ate esters of oxyalkylene and polyoxyalkylene polyol oligomers (e.g., oxyethylene glycol dimethacrylate, polyoxyethylene glycol dimethacrylate, methoxy acrylate, and polyoxyethylene acrylate), glycidyl methacrylate, ethylene, butadiene, styrene, isoprene, chloroprene, vinyl acetate, vinyl chloride, vinylidene chloride, vinylidene fluoride, acrylonitrile, vinyl chloroacetate, vinylpyridine, vinyl alkyl ethers, vinyl alkyl ketones, acrylic acid, methacrylic acid, 2-hydroxyethylacrylate, N-methylolacrylamide, 2-(N,N,N-trimethylammonium)ethyl methacrylate, and 2-acrylamido-2-methylpropanesulfonic acid (AMPS). The relative amounts of various comonomers used can generally be selected empirically, depending on the substrate to be treated, the properties desired, and the mode of application to the substrate. Useful fluorochemicals also include blends of the various fluorochemicals described above.

Also useful in the present invention are blends of fluorochemicals with fluorine-free extender compounds, such as siloxanes, (meth)acrylate and substituted acrylate polymers and copolymers, N-methylolacrylamide-containing acrylate polymers, urethanes, blocked isocyanate-containing polymers and oligomers, condensates or precondensates of urea or melamine with formaldehyde, glyoxal resins, condensates of fatty acids with melamine or urea derivatives, condensates of fatty acids with polyamides and their epichlorohydrin adducts, waxes, polyethylene, chlorinated polyethylene, alkyl ketene dimers, esters, and amides. Blends of these fluorine-free extender compounds can also be used. The relative amount of extender compound to fluorochemical is not critical. However, the overall composition of the fluorochemical treatment generally contains, relative to the amount of solids present in the system, at least about 3 weight percent, preferably at least about 5 weight percent, carbon-bound fluorine in the form of said fluorochemical groups.

Many fluorochemicals, including blends that include fluorine-free extender molecules such as those described above, are commercially available as ready-made formulations. Such products are sold, for example, as Scotchgard™ brand Carpet Protector (manufactured by 3M Co., Saint Paul, Minn.) and as Zonyl™ brand Carpet Treatment (manufactured by E.I. du Pont de Nemours and Company, Wilmington, Del.).

Useful fluorochemicals are described in European Patent No. 0 613 462 (Minnesota Mining and Manufacturing Company) and in U.S. Pat. No. 3,728,151 (Sherman et al.), U.S. Pat. No. 3,816,229 (Bierbrauer), U.S. Pat. No. 3,896,035 (Schultz et al.), U.S. Pat. No. 3,901,727 (Loudas), U.S. Pat. No. 3,916,053 (Sherman et al.), U.S. Pat. No. 4,043,923 (Loudas), U.S. Pat. No. 4,043,964 (Sherman et al.), U.S. Pat. No. 4,264,484 (Patel), U.S. Pat. No. 4,624,889 (Bries), U.S. Pat. No. 5,274,159 (Pellerite et al.), U.S. Pat. No. 5,380,778 (Buckanin), and U.S. Pat. No. 5,451,622 (Boardman et al.), the descriptions of which are incorporated herein by reference.

Fluorochemical repellents suitable for use as polymer melt additives are preferably stable at temperatures of 250° C. and above (more preferably, 300° C. and above), are preferably miscible with the insulating material at the melt processing temperature, and are preferably capable of migration to the surface of the insulating material. Thus, a preferred class of fluorochemical repellents, useful both in topical treatments and as polymer melt (or other bulk polymer) additives, includes fluorochemical oxazolidinone compositions or fluorochemical oxazolidinones comprising normally solid, water-insoluble, fluoroaliphatic radical-containing 2-oxazolidinone compounds, the compounds comprising one or more 2-oxazolidinone moieties,

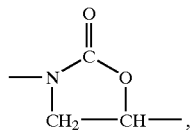

at least one of which has a monovalent fluoroaliphatic radical, $R_f$, bonded to the 5-position carbon atom thereof by an organic linking group.

A preferred subclass of such fluoroaliphatic radical-containing oxazolidinone compounds is that represented by Formula II below:

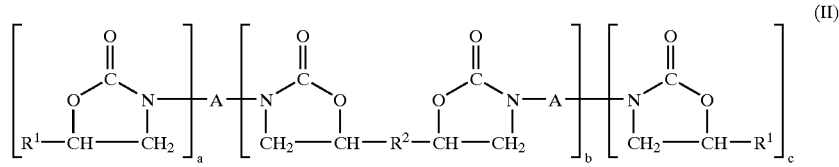

where each $R^1$ is independently hydrogen or an organic radical, which organic radical can contain —Q—$R_f$ where Q is a linking group and $R_f$ is a fluoroaliphatic radical that can optionally contain one or more catenary (in-chain) heteroatoms such as oxygen; each $R^2$ is independently an organic radical, which organic radical can contain —Q—$R_f$ where Q and $R_f$ are as defined above; with the proviso that there is at least one $R_f$ radical in one of $R^1$ and $R^2$; each A is independently an organic radical; a is zero or 1; b is a number from 0 to about 6; c is 0, 1, or 2; and the sum of a+b+c is at least 1. Preferably, $R_1$ is an organic radical that contains —Q$R_f$, where $R_f$ is a perfluoroalkyl group having from about 3 to about 20 carbon atoms (preferably, from about 4 to about 12 carbon atoms), and Q comprises a heteroatom-containing group, an organic group, or a combination thereof (preferably, Q is —$SO_2N(R')(CH_2)_k$—, —$(CH_2)_k$—, —$CON(R')(CH_2)_k$—, or —$(CH_2)_kSO_2N(R')$ $(CH_2)_k$—, where R' is hydrogen, phenyl, or a short chain (up to about 6 carbon atoms) alkyl group (preferably, methyl or ethyl), and each k is independently an integer from 1 to about 20); a is 1; b is 0; c is 0; and A is an alkyl group having from about 12 to about 22 carbon atoms. Formula II represents individual compounds or mixtures of compounds, for example, as they are obtained as products from reactions used in their preparation.

Such fluorochemical oxazolidinone compositions can be prepared using known organic reactions, for example, by the reaction of epoxides or halohydrins (for example, chlorohydrins or bromohydrins) with organic isocyanates in each of which reaction at least one of the reactants contains an $R_f$ radical. The reactions can be carried out stepwise by reacting the halohydrin with the isocyanate under urethane bond-forming conditions, for example, 20° C. to 100° C. for about 1 to 24 hours, to form a urethane intermediate, followed by addition of a base and reaction at about 20° C. to 100° C. for about 1 to 24 hours to form the oxazolidinone composition. Alternatively, an epoxide can be reacted with an isocyanate in the presence of a catalyst, such as diethyl zinc, to form the oxazolidinone directly.

Suitable fluorochemical oxazolidinones and methods for their preparation are further described in U.S. Pat. Nos. 5,025,052 and 5,099,026 (Crater et al.), the descriptions of which are incorporated herein by reference.

Other preferred fluorochemical repellents, useful both in topical treatments and as polymer melt (or other bulk polymer) additives, include those described in U.S. Pat. No. 3,899,563 (Oxenrider et al.), U.S. Pat. No. 4,219,625 (Mares et al.), U.S. Pat. No. 5,560,992 (Sargent et al.), and U.S. Pat. No. 5,681,963 (Liss); International Patent Publication Nos. WO 97/22576, WO 97/22659, and WO 97/22660 (E. I. du Pont de Nemours and Company); Japanese Patent Publication Nos. 3-041160 (Kao Corporation) and 9-323956 (Wako Junyaku Kogyo Co.); and International Patent Publication No. WO 99/05345 (Minnesota Mining and Manufacturing Company), the descriptions of which are incorporated herein by reference.

Of these, particularly preferred are the fluorochemical group-containing derivatives of long-chain (preferably, having at least about 30 carbon atoms; more preferably, dimer and trimer, as defined below) acids, alcohols, and amines. A preferred class of such derivatives includes the compounds or mixtures of compounds represented by the formulas:

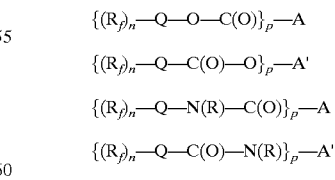

wherein $R_f$ is a fluorinated alkyl group (which can optionally contain one or more catenary (in-chain) heteroatoms such as oxygen) bonded through carbon; n is 1 or 2; Q is a divalent or trivalent linking group or a covalent bond; p is 2 or more, up to the valency of A or A'; R is a hydrogen atom or is a substituted or unsubstituted alkyl group; A is the residue of a dimer or trimer acid; and A' is the residue of a dimer diol, a dimer diamine, a trimer triol, or a trimer triamine. Preferably, $R_f$ is a perfluoroalkyl group having from about 3 to about 20 carbon atoms (preferably, from about 4 to about 12 carbon atoms); R is an alkyl group having from 1 to 6 carbon atoms; Q is —$SO_2N(R')(CH_2)_k$—, —$(CH_2)_k$—, —$CON(R')(CH_2)_k$—, or —$(CH_2)_kSO_2N(R')(CH_2)_k$—, where R' is hydrogen, phenyl, or a short chain (up to about 6 carbon atoms) alkyl group (preferably, methyl or ethyl), and each k is independently an integer from 1 to about 20; A is the residue of a dimer acid; and A' is the residue of a dimer diol or dimer diamine. The esters and "reverse" esters are preferred over the amides and "reverse" amides.

Such fluorochemical group-containing dimer and trimer acid esters can be prepared by heating a fluorochemical alcohol with either a dimer acid or a trimer acid in the presence of a standard acid catalyst, or by first making an acid chloride of the dimer/trimer acid and then reacting the acid chloride with a fluorochemical alcohol at a slightly elevated temperature (for example, 50–60° C.) in the presence of an acid scavenger. Fluorochemical group-containing "reverse" esters can be prepared by reacting a fluorochemical carboxylic acid with a dimer diol, using the same synthetic procedure as described for preparing esters. Fluorochemical group-containing amides can be prepared by reacting a fluorochemical amine with a dimer or trimer acid by heating the components together neat at an elevated temperature (at least about 220° C.), or by first making an acid chloride of the dimer/trimer acid and then reacting the acid chloride with a fluorochemical amine at a slightly elevated temperature. Fluorochemical group-containing "reverse" amides can be prepared by reacting a fluorochemical carboxylic acid with a dimer amine, using the same synthetic procedure as described for preparing esters.

The terms "dimer acid" and "trimer acid" refer to oligomerized unsaturated fatty acid products of relatively high molecular weight. The products are mixtures comprising various ratios of a variety of large or relatively high molecular weight substituted cyclohexenecarboxylic acids, predominately 36-carbon dibasic acids (dimer acid) and 54-carbon tribasic acids (trimer acid), with no single structure sufficient to characterize each. Component structures can be acyclic, cyclic (monocyclic or bicyclic), or aromatic.

Dimer and trimer acids (for use in preparing the above-described fluorochemical repellents) can be prepared by condensing unsaturated monofunctional carboxylic acids such as oleic, linoleic, soya, or tall oil acid through their olefinically unsaturated groups, in the presence of catalysts such as acidic clays. Dimer/trimer acids are commercially available from a variety of vendors, including Henkel Corporation/Emery Group (as Empol™ 1008, 1061, 1040 and 1043) and Unichema North America (as Pripol™ 1004 and 1009). Dimer diols and diamines can be made from the corresponding dimer acid by methods well known in the art. Dimer diols are commercially available from Henkel Corp./Emery Group as Empol™ 1070 and 1075 diols. Dimer amines are commercially available from Witco Corp., for example, as Kemamine™ DP-3695 amine.

Insulating Materials

Insulating materials that are suitable for topical treatment include materials that have relatively low surface and bulk conductivity and that are prone to static charge buildup. Such materials include both synthetic and naturally-occurring polymers (or the reactive precursors thereof, for example, mono- or multifunctional monomers or oligomers) that can be either organic or inorganic in nature, as well as ceramics, glasses, and ceramic/polymer composites or ceramers (or the reactive precursors thereof).

Suitable synthetic polymers (which can be either thermoplastic or thermoset) include commodity plastics such as, for example, poly(vinyl chloride), polyethylenes (high density, low density, very low density), polypropylene, and polystyrene; engineering plastics such as, for example, polyesters (including, for example, poly(ethylene terephthalate) and poly(butylene terephthalate)), polyamides (aliphatic, amorphous, aromatic), polycarbonates (for example, aromatic polycarbonates such as those derived from bisphenol A), polyoxymethylenes, polyacrylates and polymethacrylates (for example, poly(methyl methacrylate)), some modified polystyrenes (for example, styrene-acrylonitrile (SAN) and acrylonitrile-butadiene-styrene (ABS) copolymers), high-impact polystyrenes (SB), fluoroplastics, and blends such as poly(phenylene oxide)-polystyrene and polycarbonate-ABS; high-performance plastics such as, for example, liquid crystalline polymers (LCPs), polyetherketone (PEEK), polysulfones, polyimides, and polyetherimides; thermosets such as, for example, alkyd resins, phenolic resins, amino resins (for example, melamine and urea resins), epoxy resins, unsaturated polyesters (including so-called vinyl esters), polyurethanes, allylics (for example, polymers derived from allyldiglycolcarbonate), fluoroelastomers, and polyacrylates; and the like and blends thereof. Suitable naturally occurring polymers include proteinaceous materials such as silk, wool, and leather; and cellulosic materials.

Thermoplastic and thermoset polymers, including those described above, are preferred insulating materials, as such polymers can either be topically treated with the antistat/repellent combination or can be combined with it (in bulk) to form a blend. Thermoplastic polymers are more preferred in view of their melt processability. Preferably, the thermoplastic polymers are melt processable at elevated temperatures, for example, above about 150° C. (more preferably, above about 250° C.; even more preferably, above about 280° C.; most preferably, above about 320° C.). Preferred thermoset polymers include polyurethanes, epoxy resins, and unsaturated polyesters. Preferred thermoplastic polymers include, for example, polypropylene, polyethylene, copolymers of ethylene and one or more alpha-olefins (for example, poly(ethylene-butene) and poly(ethylene-octene)), polyesters, polyurethanes, polycarbonates, polyetherimides, polyimides, polyetherketones, polysulfones, polystyrenes, ABS copolymers, polyamides, fluoroelastomers, and blends thereof. More preferred are polypropylene, polyethylene, polyesters, poly(ethylene-octene), polyurethanes, polycarbonates, and blends thereof, with polypropylene, polyethylene, poly(ethylene-octene), polyurethanes, and blends thereof being most preferred.

Preparation and Use of Composition

Preferably, the composition of the invention can be prepared by (a) combining at least one ionic salt antistat, at least one fluorochemical repellent, and at least one thermoplastic polymer (optionally, along with other additives) and then melt processing the resulting combination; or (b) combining at least one ionic salt antistat, at least one fluorochemical repellent, and at least one thermosetting polymer or ceramer or the reactive precursors thereof (optionally, along with other additives) and then allowing the resulting combination to cure, optionally with the application of heat or actinic radiation. Alternative processes for preparing the composition include, for example, (c) applying a treatment composition comprising at least one ionic salt antistat and at least one fluorochemical repellent to at least a portion of at least one surface of at least one insulating material; (d) dissolving at least one ionic salt antistat, at least one fluorochemical repellent, and at least one insulating material in at least one solvent and then casting or coating the resulting solution and allowing evaporation of the solvent, optionally with the application of heat; and (e) combining at least one ionic salt antistat, at least one fluorochemical repellent, and at least one monomer (optionally, along with other additives) and then allowing polymerization of the monomer to occur, optionally in the presence of at least one solvent and optionally with the application of heat or actinic radiation. If desired, the antistat and repellent can be utilized separately, for example, one can be added prior to melt processing, and the other can then be topically applied to the resulting melt-processed combination. Separate topical treatments, etc., are also possible.

To form a melt blend by melt processing, the ionic salt antistat(s) and fluorochemical repellent(s) can be, for example, intimately mixed with pelletized or powdered polymer and then melt processed by known methods such as, for example, molding, melt blowing, melt spinning, or melt extrusion. The antistat and repellent additives can be mixed directly with the polymer or they can be mixed with the polymer in the form of a "master batch" (concentrate) of the additives in the polymer. If desired, an organic solution of the additives can be mixed with powdered or pelletized polymer, followed by drying (to remove solvent) and then by melt processing. Alternatively, the additives can be injected into a molten polymer stream to form a blend immediately prior to, for example, extrusion into fibers or films or molding into articles.

After melt processing, an annealing step can be carried out to enhance the development of antistatic and repellent characteristics. In addition to, or in lieu of, such an annealing step, the melt processed combination (for example, in the form of a film or a fiber) can also be embossed between two heated rolls, one or both of which can be patterned. An annealing step typically is conducted below the melt temperature of the polymer (for example, in the case of polyamide, at about 150–220° C. for a period of about 30 seconds to about 5 minutes). In some cases, the presence of moisture can improve the effectiveness of the ionic salt antistat(s), although the presence of moisture is not necessary in order for antistatic characteristics to be obtained.

The ionic salt antistat(s) and fluorochemical repellent(s) can be added to thermoplastic or thermosetting polymer (or, alternatively, to other insulating material) in amounts sufficient to achieve the desired antistatic and repellency properties for a particular application. The amounts can be determined empirically and can be adjusted as necessary or desired to achieve the antistatic and repellency properties without compromising the properties of the polymer (or other insulating material). Generally, the ionic salt antistat(s) and the fluorochemical repellent(s) can each be added in amounts ranging from about 0.1 to about 10 percent by weight (preferably, from about 0.5 to about 2 percent; more preferably, from about 0.75 to about 1.5 percent) based on the weight of polymer (or other insulating material).

In topical treatment of an insulating material, the combination of ionic salt antistat(s) and fluorochemical repellent(s) can be employed alone or in the form of aqueous suspensions, emulsions, or solutions, or as organic solvent (or organic solvent/water) solutions, suspensions, or emulsions. Useful organic solvents include chlorinated hydrocarbons, alcohols (for example, isopropyl alcohol), esters, ketones (for example, methyl isobutyl ketone), and mixtures thereof. Generally, the solvent solutions can contain from about 0.1 to about 50 percent, or even up to about 90 percent, by weight non-volatile solids (based on the total weight of the components). Aqueous suspensions, emulsions, or solutions are generally preferred and generally can contain a non-volatile solids content of about 0.1 to about 50 percent, preferably, about 1 to about 10 percent, by weight (based on the total weight of the components). Alternatively, however, topical treatment can be carried out by applying (to at least a portion of at least one surface of at least one insulating material) a topical treatment composition that comprises at least one ionic salt antistat that is liquid at the use or treatment temperature. Such a topical treatment process can involve the use of the neat liquid ionic salt antistat, without added solvent, and is thus preferred from an environmental perspective over the use of organic solvent solutions of the antistat/repellent combination.

The topical treatment compositions comprising the antistat/repellent combination can be applied to an insulating material by standard methods such as, for example, spraying, padding, dipping, roll coating, brushing, or exhaustion (optionally followed by the drying of the treated material to remove any remaining water or solvent). The material can be in the form of molded or blown articles, sheets, fibers (as such or in aggregated form, for example, yarn, toe, web, or roving, or in the form of fabricated textiles such as carpets), woven and nonwoven fabrics, films, etc. If desired, the antistat/repellent combination can be co-applied with conventional fiber treating agents, for example, spin finishes or fiber lubricants.

The topical treatment compositions can be applied in an amount sufficient to achieve the desired antistatic and repellency properties for a particular application. This amount can be determined empirically and can be adjusted as necessary or desired to achieve the antistatic and repellency properties without compromising the properties of the insulating material.

Any of a wide variety of constructions can be made from the composition of the invention, and such constructions will find utility in any application where some level of antistatic and repellency characteristics is required. For example, the composition of the invention can be used to prepare films and molded or blown articles, as well as fibers (for example, melt-blown or melt-spun fibers, including microfibers) that can be used to make woven and nonwoven fabrics. Such films, molded or blown articles, fibers, and fabrics exhibit antistatic and water and oil repellency (and soil resistance) characteristics under a variety of environmental conditions and can be used in a variety of applications.

For example, molded articles comprising the composition of the invention can be prepared by standard methods (for example, by high temperature injection molding) and are particularly useful as, for example, headlamp covers for automobiles, lenses (including eyeglass lenses), casings or circuit boards for electronic devices (for example, computers), screens for display devices, windows (for example, aircraft windows), and the like. Films comprising the composition of the invention can be made by any of the film making methods commonly employed in the art. Such films can be nonporous or porous (the latter including films that are mechanically perforated), with the presence and degree of porosity being selected according to the desired performance characteristics. The films can be used as, for example, photographic films, transparency films for use with overhead projectors, tape backings, substrates for coating, and the like.

Fibers comprising the composition of the invention can be used to make woven or nonwoven fabrics that can be used, for example, in making medical fabrics, medical and industrial apparel, fabrics for use in making clothing, home furnishings such as rugs or carpets, and filter media such as chemical process filters or respirators. Nonwoven webs or fabrics can be prepared by processes used in the manufacture of either melt-blown or spunbonded webs. For example, a process similar to that described by Wente in "Superfine Thermoplastic Fibers," Indus. Eng'g Chem. 48, 1342 (1956) or by Wente et al. in "Manufacture of Superfine Organic Fibers," Naval Research Laboratories Report No. 4364 (1954) can be used. Multi-layer constructions made from nonwoven fabrics enjoy wide industrial and commercial utility, for example, as medical fabrics. The makeup of the constituent layers of such multi-layer constructions can be varied according to the desired end-use characteristics, and the constructions can comprise two or more layers of melt-blown and spunbonded webs in many useful combinations such as those described in U.S. Pat. No. 5,145,727 (Potts et al.) and U.S. Pat. No. 5,149,576 (Potts et al.), the descriptions of which are incorporated herein by reference. In multi-layer constructions, the ionic salt antistat(s) and fluorochemical repellent(s) can be used in combination in one or more layers, or each can be independently segregated in one or more layers. For example, in a spunbonded/melt-blown/spunbonded ("SMS") three-layer construction, the ionic salt antistat(s) can be used in one or both spunbonded layers, and the fluorochemical repellent(s) can be used in the melt-blown layer, to impart both antistatic and repellency characteristics to the overall construction.

The ionic salt antistat(s) and fluorochemical repellent(s) used in the composition of the invention can also find utility as additives to coatings (for example, polymer or ceramer coatings). Such coatings can be antistatic, water- and oil-repellent, and scratch-resistant (as well as soil-resistant) and can be used in the photographic industry or as protective coatings for optical or magnetic recording media.

If desired, the composition of the invention can further contain one or more conventional additives commonly used in the art, for example, dyes, pigments, antioxidants, ultraviolet stabilizers, flame retardants, surfactants, plasticizers, tackifiers, fillers, and mixtures thereof. In particular, performance enhancers (for example, polymers such as polybutylene) can be utilized to improve the antistatic and/or repellency characteristics in, for example, melt additive polyolefin applications.

Objects and advantages of this invention are further illustrated by the following examples, but the particular materials and amounts thereof recited in these examples, as well as other conditions and details, should not be construed to unduly limit this invention. In the examples, where weight percent or parts by weight are indicated, these are based on the weight of the entire composition unless indicated otherwise.

EXAMPLES

Glossary

Antistats

HTS 905 and 905A—Larostat™ HTS 905 or 905A (anhydrous), $C_8H_{17}N^+(CH_3)_2CH_2CH_2OH\ ^-OSO_2CH_3$, available from BASF, Gurnee, Ill.

HTS-904—3-(2-hydroxyethyl)-1-methyl-2-undecylimidazolinium p-toluenesulfonate, available from BASF, Gurnee, Ill.

Lithium perfluorobutanesulfonate—available from 3M, St. Paul, Minn.

Anstex™ SA-300—an antistatic melt additive agent, octadecanoic acid 2-[(2-hydroxyethyl)octadecylamino] ethyl ester, available from TOHO chemical Industry Co., Japan.

Aluminum Stearate—available from All Chemie Ltd., Mt. Pleasant, S.C.

Lithium Stearate—available from ACROS Organics USA, Pittsburg, Pa.

Glycerol Monostearate—available from Sigma-Aldrich, Milwaukee, Wis.

Aliquat™ 336—Methyltrioctylammonium chloride, available from Sigma-Aldrich, Milwaukee, Wis., or from Henkel Corp., Ambler, Pa.

Starting Materials for Antistats

HQ-115—$LiN(SO_2CF_3)_2$ available from 3M, St. Paul, Minn.

PBSF—Perfluorobutanesulfonyl fluoride, available from Sigma-Aldrich, Milwaukee, Wis.

Lithium triflate—Lithium trifluoromethanesulfonate, available from Sigma-Aldrich, Milwaukee, Wis.

FC-24—Trifluoromethanesulfonic acid, available from 3M, St. Paul, Minn.

FC-754—Trimethyl-3-perfluorooctylsulfonamidopropyl-ammonium chloride, available from 3M, St. Paul, Minn.

FC-94—Lithium perfluorooctanesulfonate, available from 3M, St. Paul, Minn.

Cetylpyridinium chloride monohydrate—1-Hexadecyl-pyridinium chloride, available from Research Organics, Cleveland, Ohio.

1,3-Ethylmethylimidazolium chloride—Available from Sigma-Aldrich, Milwaukee, Wis.

Silver triflate—Silver trifluoromethanesulfonate, available from Sigma-Aldrich, Milwaukee, Wis.

$AgBF_4$—Silver tetrafluoroborate, available from Sigma-Aldrich, Milwaukee, Wis.

$NH_4PF_6$—Ammonium hexafluorophosphate, available from Sigma-Aldrich, Milwaukee, Wis.

Acetylcholine chloride—$CH_3CO_2CH_2CH_2N(CH_3)_3Cl$, available from Research Organics, Cleveland, Ohio.

Choline chloride—$HOCH_2CH_2N(CH_3)_3Cl$, available from Sigma-Aldrich, Milwaukee, Wis.

Fluorochemical Repellents

FC-808—A fluorochemical emulsion of a polymeric fluoroaliphatic ester (80 weight percent in water) for fluid repellency, available from 3M, St. Paul, Minn.

Starting Materials for Fluorochemical Repellents

MeFOSE alcohol—$C_8F_{17}SO_2N(CH_3)CH_2CH_2OH$, having an equivalent weight of 540, made in two stages by reacting POSF perfluorooctanesulfonyl fluoride with methylamine and ethylenechlorohydrin, using a procedure similar to that described in Example 1 of U.S. Pat. No. 2,803,656 (Ahlbrecht et al.).

Empol™ 1008 acid—a distilled and hydrogenated dimer acid based on oleic acid, having an acid equivalent weight of 305 as determined by titration, commercially available from Henkel Corp./Emery Group, Cincinnati, Ohio.

Pripol™ 1048 acid—a hydrogenated distilled dimer/trimer acid based on oleic acid, commercially available from Unichema North America, Chicago, Ill.

Thermoplastic Polymers

PP3505—ESCORENE™ PP3505 polypropylene, having a 400 melt index flow rate, available from Exxon Chemical Co., Baytown, Tex.

Montell H422PP—a granular polypropylene polymer (with peroxide) having an 850 melt flow index, available from Montell North America, Wilmington, Del.

PB0200—polybutylene, available from Shell Chemical Co., Houston, Tex.

PB8340—copolymer of 1-butene and ethylene, available from Shell Chemical Co., Houston, Tex.

PE6806—ASPUN™ 6806 polyethylene, having a melt flow index of 105 g/10 min (as measured by Test Method ASTM D-1238) and having a peak melting point of 124.8° C., available from Dow Chemical Co., Midland, Mich.

PS440-200—MORTHANE™ PS440-200 urethane, available from Morton Thiokol Corp., Chicago, Ill.

Test Methods

Test Method I—Melting Point Determination

The melting points of salts were determined by differential scanning calorimetry (DSC) using a 20° C. per minute temperature ramp. The peak maximum of the melt transition was taken as the melting point (Tm). Where multiple melt transitions were observed, the peak associated with the largest area melt transition was taken as the melting point.

Test Method II—Onset of Thermal Decomposition Determination

The onset of thermal decomposition of each salt was determined by thermal gravimetric analysis (TGA) under an inert nitrogen atmosphere using a 10° C. per minute temperature ramp. The value of the onset temperature was determined by finding the intersection of the extrapolated tangent at the baseline preceding onset and the extrapolated tangent at the inflection point associated with the step change in sample weight.

Test Method III—Static Charge Dissipation Test

The static charge dissipation characteristics of nonwoven fabrics, films, and molded sheets were determined with this method. The test materials were cut into 9 cm by 12 cm samples and conditioned at relative humidities (RH) of about 10 percent, 25 percent, and 50 percent for at least 12 hours. The materials were tested at temperatures that ranged from 22–25° C. The static charge dissipation time was measured according to Federal Test Method Standard 10113, Method 4046, "Antistatic Properties of Materials", using an ETS Model 406C Static Decay Test Unit (manufactured by Electro-Tech Systems, Inc., Glenside, Pa.). This apparatus induces an initial static charge (Average Induced Electrostatic Charge) on the surface of the flat test material by using high voltage (5000 volts), and a fieldmeter allows observation of the decay time of the surface voltage from 5000 volts (or whatever the induced electrostatic charge was) to 10 percent of the initial induced charge. This is the static charge dissipation time. The lower the static charge dissipation time, the better the antistatic properties are of the test material. All reported values of the static charge dissipation times in this invention are averages (Average Static Decay Rate) over at least 3 separate determinations. Values reported as >10, >60, or >100 seconds indicate that the material tested has an initial static charge which cannot be removed by surface conduction and is not antistatic. When the material tested did not accept a charge of about 3000 volts or more, it was not considered to have charged sufficiently to be antistatic.

Test Method IV—Surface Resistivity Test

This test was conducted according to the procedure of ASTM Standard D-257, "D.C. Resistance or Conductance of Insulating Materials". The surface resistivity was measured under the conditions of this test method using an ETS Model 872 Wide Range Resistance Meter fitted with a Model 803B probe (Electro-Tech Systems, Inc., Glenside, Pa.). This apparatus applies an external voltage of 100 volts across two concentric ring electrodes contacting the flat test material, and provides surface resistivity readings in ohm/square units.

Test Method V—Water Repellency Test

Nonwoven web samples were evaluated for water repellency using 3M Water Repellency Test V for Floorcoverings (February 1994), available from 3M Company. In this test, samples are challenged to penetrations by blends of deionized water and isopropyl alcohol (IPA). Each blend is assigned a rating number as shown below:

| Water Repellency Rating Number | Water/IPA Blend (% by volume) |
|---|---|
| 0 | 100% water |
| 1 | 90/10 water/IPA |
| 2 | 80/20 water/IPA |
| 3 | 70/30 water/IPA |
| 4 | 60/40 water/IPA |
| 5 | 50/50 water/IPA |
| 6 | 40/60 water/IPA |
| 7 | 30/70 water/IPA |
| 8 | 20/80 water/IPA |
| 9 | 10/90 water/IPA |
| 10 | 100% IPA |

In running the Water Repellency Test, a nonwoven web or film sample is placed on a flat, horizontal surface. Five small drops of water or a water/IPA mixture are gently placed at points at least two inches apart on the sample. If, after observing for ten seconds at a 45° angle, four of the five drops are visible as a sphere or a hemisphere, the nonwoven web or film sample is deemed to pass the test. The reported water repellency rating corresponds to the highest numbered water or water/IPA mixture for which the nonwoven sample passes the described test.

It is desirable to have a water repellency rating of at least 4, preferably at least 6.

Test Method VI—Oil Repellency Test

Nonwoven web or film samples were evaluated for oil repellency using 3M Oil Repellency Test III (February 1994), available from 3M Company, St. Paul, Minn. In this test, samples are challenged to penetration or droplet spread by oil or oil mixtures of varying surface tensions. Oils and oil mixtures are given a rating corresponding to the following:

| Oil Repellency Rating Number | Oil Composition |
|---|---|
| 0 | (fails Kaydol ™ mineral oil) |
| 1 | Kaydol ™ mineral oil |
| 2 | 65/35 (vol) mineral oil/n-hexadecane |
| 3 | n-hexadecane |
| 4 | n-tetradecane |
| 5 | n-dodecane |
| 6 | n-decane |
| 7 | n-octane |
| 8 | n-heptane |

The Oil Repellency Test is run in the same manner as is the Water Repellency Test, with the reported oil repellency rating corresponding to the highest oil or oil mixture for which the nonwoven web or film sample passes the test.

It is desirable to have an oil repellency rating of at least 1, preferably at least 3.

PREPARATION AND CHARACTERIZATION OF ANTISTATS FOR MELTING POINT AND THERMAL DECOMPOSITION

Antistat 1
Synthesis of Triethylammonium bis(perfluoroethanesulfonyl)imide, $Et_3N^+H\ ^-N(SO_2C_2F_5)_2$ This compound was prepared essentially according to the method described in U.S. Pat. No. 5,874,616 (Howells, et al), Example 3, except that the procedure was terminated once the methylene chloride solvent was evaporated. The resulting product was characterized for melting point ($T_m$) according to Test Method I and for onset of thermal decomposition ($T_d$) according to Test Method II. Results are shown in Table 1.

Antistat 2
Synthesis of Tetraethylammonium trifluoromethanesulfonate, $CF_3SO_3^{-+}NEt_4$ In a 2 L flask, 300 g of $CF_3SO_3H$ (FC-24) was charged. The acid was neutralized by slow addition of about 800 g $Et_4NOH$ aqueous solution (35%) until the pH reached about 6. A white solid (560 g) was obtained after drying by rotary evaporation, then under high vacuum. The solid was re-crystallized from chloroform-heptane to give 520 g pure product. This product was also characterized for melting point ($T_m$) according to Test Method I and for onset of thermal decomposition ($T_d$) according to Test Method II. Results are shown in Table 1.

Antistat 3
Synthesis of Tetraethylammonium bis(trifluoromethanesulfonyl)imide, $(CF_3SO_2)_2N^{-+}NEt_4$ in Water-$CH_2Cl_2$ Mixed Solvent In a 1 L flask, 50 g of $(CF_3SO_2)_2N^-\ Li^+$ (HQ-115) was dissolved in 50 g of deionized water. The solution was combined with 89 g of 35% $Et_4NOH$ aqueous solution under $N_2$. Solid precipitated during the addition, which was dissolved by the addition of 50 g $CH_2Cl_2$. The bottom organic layer was isolated. The aqueous solution was extracted with another 50 g of $CH_2Cl_2$. The combined organic solution was washed with water (2×25 mL), and volatiles were removed by rotary evaporation. Re-crystallization of the crude product from $CH_3OH$—$H_2O$ gave 70 g of white solid after full vacuum drying. The product was characterized for melting point ($T_m$) according to Test Method I and for onset of thermal decomposition ($T_d$) according to Test Method II. Results are shown in Table 1.

Antistat 4
Synthesis of Tetrabutylammonium bis(trifluoromethanesulfonyl)imide, $(C_4H_9)_4N^{+-}N(SO_2CF_3)_2$ This compound was prepared by reacting $(C_4H_9)_4N^+Br^-$ (Sigma-Aldrich, Milwaukee, Wis.) with approximately a 10% molar excess of $Li^{+-}N(SO_2CF_3)_2$ (HQ-115) essentially according to the procedure described in Example 18 of U.S. Pat. No. 5,554,664 (Lamanna et al). The resulting product was characterized for melting point ($T_m$) according to Test Method I and for onset of thermal decomposition ($T_d$) according to Test Method II. Results are shown in Table 1.

TABLE 1

Melting Point ($T_m$) and Onset of Thermal Decomposition ($T_d$) Values

| Antistat | Formula | $T_m$ (° C.) | $T_d$ (° C.) |
|---|---|---|---|
| 1 | $Et_3N^+H\ ^-N(SO_2C_2F_5)_2$ | −10 | 351 |
| 2 | $CF_3SO_3^-\ ^+NEt_4$ | 133 | 371 |
| 3 | $(CF_3SO_2)_2N^-\ ^+NEt_4$ | 8 | 426 |
| 4 | $(C_4H_9)_4N^{+-}N(SO_2CF_3)_2$ | 93 | 401 |
| 23 | $(C_8H_{17})_3N^+(CH_3)\ Cl^-$ | <28 | 177 |

The data in Table 1 shows that Antistats 1–4, which comprise weakly coordinating fluoroorganic anions, exhibited much greater thermal stability than Antistat 23, which has the more strongly coordinating chloride anion.

Antistat 5
Synthesis of 1-Hexadecylpyridinium Bis(perfluoroethanesulfonyl)imide, $n-C_{16}H_{33}$-cyc-$N^+C_5H_5\ ^-N(SO_2C_2F_5)_2$ This compound was prepared essentially according to the method of Antistat 6, except that 85.1 g of $Li^{+-}N(SO_2C_2F_5)_2$ (HQ-115) was employed as the anion precursor instead of $Li^{+-}OSO_2C_4F_9$. The product was characterized for melting point ($T_m$) according to Test Method I and for onset of thermal decomposition ($T_d$) according to Test Method II. Results are shown in Table 2.

Antistat 6
Synthesis of 1-Hexadecylpyridinium Perfluorobutanesulfonate, $n-C_{16}H_{33}$-cyc-$N^+C_5H_5\ ^-OSO_2C_4F_9$ Cetylpyridinium chloride monohydrate (75 g) was dissolved in 800 ml water with gentle heating and magnetic stirring. To this solution was added 67.3 g of $Li^{+-}OSO_2C_4F_9$ (prepared by hydrolysis of $C_4F_9SO_2F$ [PBSF] with LiOH) dissolved in 600 mL of water with stirring. The resulting product precipitated immediately and was isolated by suction filtration. The product was washed with copious amounts of water and then dried initially by suction and then in vacuo at $10^{-2}$ Torr, 40° C. The product was characterized for melting point ($T_m$) according to Test Method I and for onset of thermal decomposition ($T_d$) according to Test Method II. Results are shown in Table 2.

Antistat 7
Synthesis of 1-Hexadecylpyridinium Perfluorooctanesulfonate, $n-C_{16}H_{33}$-cyc-$N^+C_5H_5\ ^-OSO_2C_8F_{17}$ This compound was prepared essentially according to the method of Antistat 6, except that 111.3 g of $Li^{+-}OSO_2C_8F_{17}$ (FC-94) was employed as the anion precursor. The resulting product was characterized for melting point ($T_m$) according to Test Method I and for onset of thermal decomposition ($T_d$) according to Test Method II. Results are shown in Table 2.

Antistat 8
Synthesis of n-Butylpyridinium Bis(trifluoromethanesulfonyl)imide, $n-C_4H9$-cyc-$N^+C_5H_5\ ^-N(SO_2CF_3)_2$ A solution of 50 g $Li^{+-}N(SO_2CF_3)_2$ (HQ-115) (287 g/mol, 0.174 mol) and 100 ml DI water was prepared. Another solution of 30 g butylpyridinium chloride (171.6 g/mol, 0.174) and 100 ml deionized water was prepared. The two solutions were added to a separatory funnel along with 200 ml methylene chloride. The mixture was thoroughly shaken, and the phases were allowed to separate. The organic phase was isolated and washed with 3×200 ml deionized water. The organic layer was then concentrated by reduced pressure distillation on a rotary evaporator. The resulting yellow oil was vacuum dried at 120 C overnight to afford 70 g product (97% yield). The product was characterized for melting point ($T_m$) according to Test Method I and for onset of thermal decomposition ($T_d$) according to Test Method II. Results are shown in Table 2.

Antistat 9
Synthesis of n-Butylpyridinium Perfluorobutanesulfonate, $n-C_4H9$-cyc-$N^+C_5H_5\ ^-OSO_2C_4F_9$ A solution of 20 g butylpyridinium chloride (171.6 g/mol, 0.116 mol) was made with 100 ml deionized water. A similar solution was prepared using 35.7 g $Li^{+-}OSO_2C_4F_9$ (prepared by hydrolysis of $C_4F_9SO_2F$ [PBSF] with LiOH) (306 g/mol, 0.116 mol) and 100 ml water. The two solutions were added to a separatory funnel along with 200 ml methylene chloride. The mixture was thoroughly shaken, and the phases were allowed to separate. The organic phase was isolated and washed with 200 ml DI water. The mixture was slow to separate, consequently further washings were not done. The organic layer was concentrated by reduced pressure distillation on a rotary evaporator, and then dried under vacuum at 130° C. overnight. The resulting yellow oil weighed 44 g (87% yield) and was characterized for melting point ($T_m$) according to Test Method I and for onset of thermal decomposition ($T_d$) according to Test Method II. Results are shown in Table 2.

TABLE 2

Melting Point ($T_m$) and Onset of Thermal Decomposition ($T_d$) Values

| Antistat | Formula | $T_m$ (° C.) | $T_d$ (° C.) |
| --- | --- | --- | --- |
| 5 | n-$C_{16}H_{33}$-cyc-$N^+C_5H_5$ $^-N(SO_2C_2F_5)_2$ | 34 | 396 |
| 6 | n-$C_{16}H_{33}$-cyc-$N^+C_5H_5$ $^-OSO_2C_4F_9$ | 95 | 357 |
| 7 | n-$C_{16}H_{33}$-cyc-$N^+C_5H_5$ $^-OSO_2C_8F_{17}$ | 93 | 364 |
| 8 | n-$C_4H_9$-cyc-$N^+C_5H_5$ $^-N(SO_2CF_3)_2$ | 33 | 430 |
| 9 | n-$C_4H_9$-cyc-$N^+C_5H_5$ $^-OSO_2C_4F_9$ | 63 | 391 |

Table 2 shows that the pyridinium cation-containing Antistats 5–9, which comprise weakly coordinating fluoroorganic anions, exhibited very good thermal stability.

Antistat 10
Synthesis of 1,3-Ethylmethylimidazolium Bis (trifluoromethanesulfonyl)imide, $CH_3$-cyc-($N^+C_2H_2NCH$)$CH_2CH_3$ $^-N(SO_2CF_3)_2$ 1,3-Ethylmethylimidazolium chloride (50.0 g) and LiN($SO_2CF_3$)$_2$ (HQ-115) (102.8 g) were combined in 500 mL of water with magnetic stirring. An immiscible light yellow oil of low viscosity separated as a lower liquid phase. The mixture was transferred to a separatory funnel, and 500 mL of methylene chloride was added. The mixture was shaken vigorously and allowed to phase separate. The lower organic phase was isolated and washed with two additional 500 mL portions of water. The washed methylene chloride phase was isolated, dried over anhydrous aluminum oxide beads, filtered by suction and vacuum stripped at 30–100° C., 20–10$^{-3}$ Torr to remove all volatiles. A total of 112.2 g (84% yield) of light yellow oil of high purity was obtained, which was identified as the title compound by $^1H$ and $^{19}F$ NMR. The product was also characterized for melting point ($T_m$) according to Test Method I and for onset of thermal decomposition ($T_d$) according to Test Method II. Results are shown in Table 3.

Antistat 11
Synthesis of 1,3-Ethylmethylimidazolium Nonafluorobutanesulfonate, $CH_3$-cyc-($N^+C_2H_2NCH$)$CH_2CH_3$ $^-OSO_2C_4F_9$ 1,3-Ethylmethylimidazolium chloride (49.1 g) and LiOSO$_2$C$_4$F$_9$ (107.6 g, prepared by hydrolysis of $C_4F_9SO_2F$ with LiOH) were combined in 500 mL of water with magnetic stirring. A homogeneous aqueous solution was formed, which was transferred to a separatory funnel, combined with 500 mL of $CH_2Cl_2$ and worked up essentially according to the procedure for Antistat 10. After vacuum stripping all volatiles, a total of 65.0 g (47% yield) of light yellow oil of high purity was obtained, which was identified as the title compound by $^1H$ and $^{19}F$ NMR. The product was also characterized for melting point ($T_m$) according to Test Method I and for onset of thermal decomposition ($T_d$) according to Test Method II. Results are shown in Table 3.

Antistat 12
Synthesis of 1,3-Ethylmethylimidazolium trifluoromethanesulfonate, $CH_3$-cyc-($N^+C_2H_2NCH$)$CH_2CH_3$ $^-OSO_2CF_3$ 1,3-Ethylmethylimidazolium chloride (29 g, 0.199 mole) was dissolved in 100 ml of water and added to solution of 50 g silver triflate (0.195 mol) in 200 g water with stirring. The resulting silver chloride precipitate was removed by filtration, and the solids were washed with 100 ml of deionized water. The filtrate was concentrated on a rotary evaporator and further dried at 75° C. overnight to provide 47.5 g of a light green oil that was characterized by $^1H$ and $^{19}F$ NMR. The product was also characterized for melting point ($T_m$) according to Test Method I and for onset of thermal decomposition ($T_d$) according to Test Method II. Results are shown in Table 3.

Antistat 13
Synthesis of 1,3-Ethylmethylimidazolium Tetrafluoroborate, $CH_3$-cyc-($N^+C_2H_2NCH$)$CH_2CH_3$ $BF_4^-$ Separate solutions of 49.6 g AgBF4 (194.68 g/mol, 0.255 mol) in 200 ml distilled water, and 37.35 g 1,3-ethylmethylimidazolium chloride (146.62 g/mol, 0.255 mol) in 200 ml distilled water were prepared. The two solutions were mixed together, instantly forming a white precipitate. The precipitate was allowed to settle, followed by filtration through a D-frit. The filtrate was concentrated, but not to dryness, and allowed to stand at room temperature overnight. The next morning a black precipitate was observed to have fallen out of solution. The solution was passed through filter paper to removed the small amount of solid. The remaining water was removed by reduced pressure distillation on a rotary evaporator. The remaining oil was dissolved in 200 ml acetonitrile. More insoluble black precipitate was formed and was filtered out of the solution. The resulting yellow filtrate was concentrated on the rotary evaporator, and the resulting oil was dried overnight under vacuum at 75C. The isolated weight of product was 40 g (79% yield). The product was characterized for melting point ($T_m$) according to Test Method I and for onset of thermal decomposition ($T_d$) according to Test Method II. Results are shown in Table 3.

Antistat 14
Synthesis of 1,3-Ethylmethylimidazolium Hexafluorophosphate, $CH_3$-cyc-($N^+C_2H_2NCH$)$CH_2CH_3$ $PF_6^-$ A solution of 500 ml acetonitrile and 73.1 g 1,3-ethylmethylimidazolium chloride (146.6 g/mol, 0.498 mol) was prepared in a 1 L flask. Another solution of 250 ml acetonitrile and 81.1 g $NH_4PF_6$ (163 g/mol, 0.498 mol) was similarly prepared and added to the former solution. A white precipitate instantly formed on mixing of the two solutions. The flask was chilled to near 0° C. for 1 hour followed by filtration through high purity Celite™ filter agent using a D-frit. The solvent was removed from the filtrate by reduced pressure distillation on a rotary evaporator. The resulting ionic salt was dried under vacuum at 75 C overnight. The isolated weight of the ionic salt product was 114 g (89% yield). The product was characterized for melting point ($T_m$) according to Test Method I and for onset of thermal decomposition ($T_d$) according to Test Method II. Results are shown in Table 3.

Table 3. Melting Point ($T_m$) and Onset of Thermal Decomposition ($T_d$) Values

| Antistat | Formula | $T_m$ (° C.) | $T_d$ (° C.) |
| --- | --- | --- | --- |
| 10 | $CH_3$-cyc-($N^+C_2H_2NCH$)$CH_2CH_3$ $^-N(SO_2CF_3)_2$ | −18 | 450 |
| 11 | $CH_3$-cyc-($N^+C_2H_2NCH$)$CH_2CH_3$ $^-OSO_2C_4F_9$ | 18 | 410 |
| 12 | $CH_3$-cyc-($N^+C_2H_2NCH$)$CH_2CH_3$ $^-OSO_2CF_3$ | −16 | 429 |
| 13 | $CH_3$-cyc-($N^+C_2H_2NCH$)$CH_2CH_3$ $BF_4^-$ | 7 | 420 |
| 14 | $CH_3$-cyc-($N^+C_2H_2NCH$)$CH_2CH_3$ $PF_6^-$ | 70 | 490 |

The data of Table 3 show that the imidazolium cation-containing antistats, which comprise weakly coordinating fluoroorganic anions, all exhibited excellent thermal stability, with all $T_d$ values greater than 400° C.

Antistat 15
Synthesis of 1-Dodecyl-2-ethyl-3-[2-hydroxyethyl] imidazolinium Toluenesulfonate, $C_{12}H_{25}$-cyc-$[N^+C_2H_4N(CH_2CH_2OH)C]C_2H_5$ $^-OSO_2C_6H_4CH_3$ A 142.2 g sample of 2-ethyl-3-[2-hydroxyethyl] imidazoline (prepared essentially as described in U.S. Pat. No. 4,014,880) was combined with 340 g of 1-dodecyl toluenesulfonate (prepared essentially as described in *Organic Synthesis*, Collected Volume 3, p. 336 (1955) in a 1 liter three-neck round bottom flask and heated at a temperature of 75° C. with stirring for 4 hours. The resulting imidazolinium salt was transferred to a container for storage.

Antistat 16
Synthesis of Octyldimethyl-2-hydroxyethylammonium bis(trifluoromethylsulfonyl)imide, $C_8H_{17}N^+(CH_3)_2CH_2CH_2OH$ $^-N(SO_2CF_3)_2$ A 19.2 g sample of $C_8H_{17}N^+(CH_3)_2CH_2CH_2OH$ $^-OSO_2CH_3$ (HTS 905A) was combined with 15.7 g LiN$(SO_2CF_3)_2$ (HQ-115) in 120 mL of water. After agitating the mixture, a clear, immiscible oil separated as a lower liquid phase. The mixture was transferred to a separatory funnel and 125 mL of methylene chloride was added. The mixture was shaken vigorously and allowed to phase separate. The lower organic phase was isolated and washed with two additional 125 mL portions of water. The washed methylene chloride phase was isolated, dried over anhydrous aluminum oxide beads, filtered by suction and vacuum stripped at 30–100° C., 20–$10^{-3}$ Torr to remove all volatiles. A colorless oil (22.6 g, 85% yield) of high purity was obtained, which was identified as the title compound by $^1H$, $^{13}C$ and $^{19}F$ NMR. The product was also characterized for melting point ($T_m$) according to Test Method I and for onset of thermal decomposition ($T_d$) according to Test Method II. Results are shown in Table 4.

Antistat 17
Synthesis of Octyldimethyl-2-hydroxyethylammonium perfluorobutanesulfonate, $C_8H_{17}N^+(CH_3)_2CH_2CH_2OH$ $^-OSO_2C_4F_9$ A 118.5 g (0.399 mol) sample of $C_8H_{17}N^+(CH_3)_2CH_2CH_2OH$ $^-OSO_2CH_3$ (HTS 905A) was dissolved in about 250 ml of water and 123.9 g (0.399 mol) of LiOSO$_2C_4F_9$ (prepared by hydrolysis of $C_4F_9SO_2F$ [PBSF] with LiOH) was dissolved in about 100 ml of water. The two solutions were added to a separatory funnel and the mixture was shaken vigorously. Next 200 ml of methylene chloride was added to the funnel and the contents were shaken and allowed to phase separate. The lower methylene chloride layer was washed twice with about 200 ml of water and concentrated on a rotary evaporator at about 85° C. for about 45 minutes to yield an off-white solid product, which was characterized by $^1H$ and $^{13}C$ nuclear magnetic resonance spectroscopy (NMR). The product was also characterized for melting point ($T_m$) according to Test Method I and for onset of thermal decomposition ($T_d$) according to Test Method II. Results are shown in Table 4.

Antistat 18
Synthesis of Octyldimethyl-2-hydroxyethylammonium trifluoromethanesulfonate, $C_8H_{17}N^+(CH_3)_2CH_2CH_2OH$ $^-OSO_2CF_3$ Into 30 g of acetonitrile in a 125 ml Erlenmeyer flask was dissolved with heating 29.7 g (0.1 mole) HTS-905A ($C_8H_{17}N^+(CH_3)_2CH_2CH_2OH$ $^-O_3SCH_3$) and then cooled in an ice bath for 10 minutes. In another 125 ml Erlenmeyer flask was dissolved with heating 15.6 g (0.1 mole) lithium triflate into 30 ml of acetonitrile. Next, the lithium triflate solution was added over a period of about 1 minute to the stirred, cooled HTS-905A solution with generation of a white precipitate. About 2 ml of acetonitrile was used to rinse the Erlenmeyer flask that held the lithium triflate solution, and this was also added to the HTS-905A solution. The resulting reaction mixture was allowed to stir for about 10 minutes and was then vacuum filtered through a pad of Celite™ filter agent on a 125 ml Buchner funnel with a C porosity frit. The reaction flask and Celite™ pad were washed with an additional 30 g of ice-cold acetonitrile. The filtrate was concentrated on a rotary evaporator at about 50 mm Hg with a bath temperature of about 85° C. for about 45 minutes to yield 24.5 g of a clear solid product, which was characterized by $^1H$ and $^{13}C$ NMR. The product was also characterized for melting point ($T_m$) according to Test Method I and for onset of thermal decomposition ($T_d$) according to Test Method II. Results are shown in Table 4.

Antistat 19
Synthesis of Octyldimethyl-2-hydroxyethylammonium tris(trifluoromethanesulfonyl)methide, $C_8H_{17}N^+(CH_3)_2CH_2CH_2OH$ $^-C(SO_2CF_3)_3$ A 20.0 g sample of $C_8H_{17}N^+(CH_3)_2CH_2CH_2OH$ $^-OSO_2CH_3$ (HTS 905) was combined with 29.6 g HC$(SO_2CF_3)_3$ (prepared as described in Example 1 of U.S. Pat. No. 5,554,664 (Lamanna et al.) in 250 mL of water. After agitating the resulting mixture, a clear, viscous, pale yellow, immiscible oil separated as a lower liquid phase. The mixture was transferred to a separatory funnel, combined with 300 mL of methylene chloride, and worked up essentially according to the procedure Antistat 16. After vacuum stripping all volatiles, a total of 29.0 g (79% yield) of pale yellow oil product was obtained, which was identified as the title compound by $^1H$ and $^{19}F$ NMR. Estimated purity from the NMR analysis was greater than 90 weight %, the major impurity being the corresponding $^-C(SO_2CF_3)_2(SO_2F)$ salt. The product was also characterized for melting point ($T_m$) according to Test Method I and for onset of thermal decomposition ($T_d$) according to Test Method II. Results are shown in Table 4.

Antistat 20
Synthesis of Trimethyl-2-acetoxyethylammonium bis(trifluoromethylsulfonyl)imide, $(CH_3)_3N^+CH_2CH_2OC(O)CH_3$ $^-N(SO_2CF_3)_2$ Acetylcholine chloride (98 g, Research Organics, Cleveland, Ohio) and LiN$(SO_2CF_3)_2$ (HQ-115) (165.8 g) were combined in 600 mL of water with magnetic stirring. A viscous, immiscible oil separated as a lower liquid phase. The resulting mixture was worked up essentially as described for Antistat 16, except that the ionic liquid product was not completely miscible with methylene chloride, forming 3 separate liquid phases in the presence of water. The lower ionic liquid phase and the middle CH$_2$Cl$_2$ phase were both carried through the workup. After vacuum stripping all volatiles, a total of 179.1 g (77% yield) of colorless oil product of high purity was obtained, which was identified as the title compound by $^1H$, $^{13}C$ and $^{19}F$ NMR. The product was also characterized for melting point ($T_m$) according to Test Method I and for onset of thermal decomposition ($T_d$) according to Test Method II. Results are shown in Table 4.

Antistat 21
Synthesis of Trimethyl-2-hydroxyethylammonium bis(perfluorobutanesulfonyl)imide, $(CH_3)_3N^+CH_2CH_2OH$ $^-N(SO_2C_4F_9)_2$ Choline chloride (37.34 g) and LiN$(SO_2C_4F_9)_2$ (142.7 g, prepared essentially according to Example 4 in U.S. Pat. No. 5,874,616 (Howells et al.) were combined in 400 mL of water with magnetic stirring. A viscous, immiscible oil separated as a lower liquid phase. The mixture was transferred to a separatory funnel, and 110 mL of diethyl ether were added. The mixture was shaken vigorously and allowed to phase separate. The lower organic phase was isolated and washed with two additional 400 mL portions of water. The washed ether phase was isolated and vacuum stripped at 30–100° C., 20–10$^{-3}$ Torr to remove all volatiles. The resulting colorless oil product (155.3 g, 93% yield) of high purity was obtained, which was identified as the title compound by $^1$H, $^{13}$C and $^{19}$F NMR. The product was also characterized for melting point ($T_m$) according to Test Method I and for onset of thermal decomposition ($T_d$) according to Test Method II. Results are shown in Table 4.

Antistat 22

Larostat™ HTS 905A, octyldimethylhydroxyethylammonium methanesulfonate ($C_8H_{17}N^+(CH_3)_2C_2H_4OH$ $^-OSO_2CH_3$) was also characterized for melting point ($T_m$) according to Test Method I and for onset of thermal decomposition ($T_d$) according to Test Method II. Results are shown in Table 4.

TABLE 4

Melting Point ($T_m$) and Onset of Thermal Decomposition ($T_d$) Values

| Antistat | Formula | $T_m$ (° C.) | $T_d$ (° C.) |
|---|---|---|---|
| 16 | $C_8H_{17}N^+(CH_3)_2CH_2CH_2OH$ $^-N(SO_2CF_3)_2$ | None detected | 409 |
| 17 | $C_8H_{17}N^+(CH_3)_2CH_2CH_2OH$ $^-OSO_2C_4F_9$ | 147 | 374 |
| 18 | $C_8H_{17}N^+(CH_3)_2CH_2CH_2OH$ $^-OSO_2CF_3$ | -26 | 370 |
| 19 | $C_8H_{17}N^+(CH_3)_2CH_2CH_2OH$ $^-C(SO_2CF_3)_3$ | None detected | 387 |
| 20 | $(CH_3)_3N^+CH_2CH_2OC(O)CH3$ $^-N(SO_2CF_3)_2$ | 24 | 361 |
| 21 | $(CH_3)_3N^+CH_2CH_2OH$ $^-N(SO_2C_4F_9)_2$ | 32 | 402 |
| 22 | $C_8H_{17}N^+(CH_3)_2CH_2CH_2OH$ $^-OSO_2CH_3$ | About 30 | 289 |

The results in Table 4 show that among antistats having the same cation, those containing weakly coordinating fluoroorganic anions (Antistats 16–21) exhibited greatly increased thermal stability relative to that of Antistat 22, which has a more strongly coordinating anion.

Antistat 23

Aliquat™ 336, methyltrioctylammonium chloride (($C_8H_{17})_3N^+(CH_3)$ Cl$^-$), a liquid at room temperature, was characterized for onset of thermal decomposition ($T_d$) according to Test Method II. Results are shown in Table 1.

Antistat 24

Synthesis of tetrabutylphosphonium perfluorobutanesulfonate, $(C_4H_9)_4P^{+-}OSO_2C_4F_9$ This compound can be prepared as follows: Potassium perfluorobutanesulfonate is prepared essentially as in Example 3 of U.S. Pat. No. 2,732,398 (Brice et al.), except that PBSF is substituted for $CF_3(CF_2)_4SO_2F$. The potassium ion is exchanged for a proton using an ion exchange column (Amberjet™ 1200 H, available from Sigma-Aldrich, Milwaukee, Wis.). The resulting perfluorobutanesulfonic acid is combined with an equal molar amount of tetrabutylphosphonium hydroxide (available from Sigma-Aldrich, Milwaukee, Wis.) in an acid-base reaction, resulting in a high yield and high purity tetrabutylphosphonium perfluorobutanesulfonate.

PREPARATION OF REPELLENT ADDITIVES

Fluorochemical Repellent FR-1

Fluorochemical Repellent FR-1 (a fluorochemical oxazolidinone) was prepared by reacting N-methylperfluorooctylsulfonamide with epichlorohydrin to form the fluorochemical chlorohydrin, $C_8F_{17}SO_2N(Me)CH(OH)CH_2Cl$, which was further reacted with octadecyl isocyanate at a 1:1 molar ratio followed by ring closure using essentially the same procedure as described in Scheme I of U.S. Pat. No. 5,025,052 (Crater et al.).

Fluorochemical Repellent FR-2

Fluorochemical Repellent FR-2 (a fluorochemical ester) was prepared by esterifying MeFOSE alcohol with Empol™ 1008 dimer acid at a molar ratio of 2:1 using the following procedure. A 500 mL 2-necked round-bottom flask equipped with overhead condenser, thermometer and Dean-Stark trap wrapped with heat tape was charged with 57.8 g (0.190 eq) of Empol™ 1008 dimer acid, 100 g (0.185 eq) of MeFOSE alcohol, 1 g of p-toluenesulfonic acid and 50 g of toluene. The resulting mixture was placed in an oil bath heated to 150° C. The degree of esterification was monitored by measuring the amount of water collected in the Dean-Stark trap and also by using gas chromatography to determine the amount of unreacted fluorochemical alcohol. After 18 hours of reaction, about 2.8 mL of water was collected and a negligible amount of fluorochemical alcohol remained, indicating a complete reaction. The reaction mixture was then cooled to 100° C. and was twice washed with 120 g aliquots of deionized water, the final water wash having a pH of 3. The final wash was removed from the flask by suction, and the reaction mixture was heated to 120° C. at an absolute pressure of about 90 torr to remove volatiles. The resulting product, a brownish solid, was characterized as containing the desired fluorochemical ester by $^1$H and $^{13}$C NMR spectroscopy and thermogravimetric analysis.

Fluorochemical Repellent FR-3

Fluorochemical Repellent FR-3 (a fluorochemical ester) was prepared by esterifying MeFOSE alcohol with Pripol™ 1048 dimer/trimer acid at a molar ratio of 2:1 using essentially the same procedure as was used for preparing Fluorochemical Repellent FR-2.

Fluorochemical Repellent FR-4

Fluorochemical Repellent FR-4 (a fluorochemical ester) was prepared by esterifying MeFOSE alcohol with dodecanedioic acid at a molar ratio of 2:1 using essentially the same procedure as was used for preparing Fluorochemical Repellent FR-2.

Example 1

Fluorochemical Repellent FR-1 and HTS-905 (Antistat 22) were dry blended with a mixture of polybutylene PB0200 and polypropylene PP3505 400 melt flow resin (in a weight ratio of 1 part PB0200 to 10 parts PP3505) at 0.85 and 1 weight % of the polypropylene resin, respectively. The mixture was extruded, on a 1.9 cm Brabender extruder with a 25.4 cm die, into blown microfibers with a diameter of less than about 10 microns (Wente, Van A., "superfine Thermoplastic fibers", Industrial and Eng. Chemistry, Vol. 48, No. 8, 1956, pp. 1342–1345, and Naval Research Laboratory Report 111437, Apr. 15, 1954). The first extruder zone was set at 265° C., and all other zones were set at 275° C. The die air temperature was set at 277° C., and the melt temperature was recorded at 279° C. The metering gear pump speed was set at 70 rpm. The die was configured with an air gap setting of 0.763 mm and a set back of 0.69 mm. With a collector distance of 30.5 cm, the take up speed was set to deliver a melt blown nonwoven formed from the microfibers with a basis weight of 50 grams/m². The resulting nonwoven samples were calendered on a 5% bond area embossing roll at 93.3° C. at 30.5 cm/min. and at 35.7 Kg/lineal cm. The nonwoven samples were tested for oil and water repellency according to Test Methods V and VI. The nonwoven samples were also conditioned at 50% relative humidity (23° C.) and tested for static charge dissipation according to Test Method III. Results are shown in Table 5.

Comparative Example C1

Nonwoven samples were made and tested essentially as in Example 1, except that no HTS-905 was used. The results are shown in Table 5.

Comparative Example C2

Nonwoven samples were made and tested essentially as in Example 1, except that no repellent was used, and the level of HTS-905 was 0.5 weight % of the polypropylene resin. The results are shown in Table 5.

TABLE 5

Repellency and Static Charge Dissipation Properties of Polypropylene Melt-Blown Nonwovens

| Example No. | Repellent (Wt %) | Antistat (Wt %) | Repellency O | Repellency W | Static Decay (sec) |
|---|---|---|---|---|---|
| 1 | FR-1 (0.85%) | Antistat 22 (1%) | 6 | 10 | 0.07 |
| C1 | FR-1 (0.85%) | None | 6 | 10 | >100.0 |
| C2 | None | Antistat 22 (1%) | 0 | 3 | 0.01 |

O = oil
W = water

The results in Table 5 show that the combination of repellent and ionic antistat compound in a thermoplastic polymer provided excellent static charge dissipation and excellent repellency properties.

Examples 2–6 and Comparative Example C3

Fluorochemical Repellent FR-1 and Antistat 15 $C_{12}H_{25}$-cyc-[$N^+C_2H_4N(CH_2CH_2OH)C]C_2H_5$ $^-OSO_2C_6H_4CH_3$) were dry blended with PP3505. FR-1 was used at 1 weight % based on the weight of PP3505, and Antistat 15 was used at 0.5, 0.6, 0.7, 0.8, and 1 weight %, also based on the weight of PP3505. Nonwoven samples were made and tested essentially as in Example 1. For comparison purposes, nonwoven samples were made and tested essentially as in Example 1 without repellent or antistat (Comparative Example C3). The results are shown in Table 6.

Example 7

Fluorochemical Repellent FR-1 (1 weight %) and Antistat 15 (1 weight %) were dry blended with a mixture of PP3505 (80 weight %) and PB8340 (20 weight %). Nonwoven samples were made and tested essentially as in Example 1, and the results are shown in Table 6.

TABLE 6

Repellency and Static Charge Dissipation Properties of Polypropylene Melt-Blown Nonwovens

| Example No. | Repellent FR-1 (weight %) | Antistat 15 (weight %) | Repellency Oil | Repellency Water | Static Decay (sec) |
|---|---|---|---|---|---|
| C3 | 0 | 0 | 0 | 2 | WNC[1] |
| 2 | 1.0 | 0.5 | 3 | 8 | 0.15 |
| 3 | 1.0 | 0.6 | 3 | 8 | 0.11 |
| 4 | 1.0 | 0.7 | 2 | 8 | 0.06 |
| 5 | 1.0 | 0.8 | 2 | 8 | 0.09 |
| 6 | 1.0 | 1.0 | 2 | 8 | 0.04 |
| 7 | 1.0 | 1.0 | 4 | 9 | 0.05 |

[1]Will not accept charge, therefore not antistatic.

The results in Table 6 show that a combination of a fluorochemical oxazolidinone and Antistat 15 (imidazolinium toluenesulfonate ionic antistat) provided both repellency and good static charge dissipation properties in polypropylene, and that these properties were further enhanced with added polybutylene.

Example 8

Fluorochemical Repellent FR-1 (0.85 weight %) and antistat HTS-904 (1 weight %) were dry blended with PP3505. Nonwoven samples were made from this blend and tested essentially as in Example 1. The results are shown in Table 7.

Example 9

Fluorochemical Repellent FR-1 (0.85 weight %) and antistat HTS-904 (1 weight %) were dry blended with a mixture of PP3503 (85 weight %) and PB8340 (15 weight %). Nonwoven samples were made from this blend and tested essentially as in Example 1. The results are shown in Table 7.

TABLE 7

Repellency and Static Charge Dissipation Properties of Polypropylene Melt-Blown Nonwovens

| Example No. | PB8340 (Wt %) | Repellent (wt %) | Antistat (Wt %) | Repellency O | Repellency W | Static Decay (sec) |
|---|---|---|---|---|---|---|
| 8 | 0 | FR-1 (0.85%) | HTS-904 (1%) | 2 | 9 | 0.01 |
| 9 | 15 | FR-1 (0.85%) | HTS-904 (1%) | 6 | 10 | 0.05 |

O = oil
W = water

The results in Table 7 show that the addition of polybutylene significantly increased the repellency of a polypropylene nonwoven containing a combination of a fluorochemical repellent and an antistat, without loss of excellent antistatic properties.

Comparative Examples C4–C6

Nonwoven samples containing 0 or 1.0 weight % Fluorochemical Repellent FR-1 and 0, 1.0, or 1.25 weight % Anstex™ SA-300 nonionic antistat were prepared and tested essentially as in Example 1. The results are shown in Table 8.

TABLE 8

Repellency and Static Charge Dissipation Properties of Polypropylene Melt-Blown Nonwovens

| Example No. | Repellent FR-1 (wt. %) | Antistat SA-300 (wt. %) | Repellency Oil | Repellency Water | Static Decay (sec) |
|---|---|---|---|---|---|
| C3 | 0 | 1.0 | 0 | 2 | 14.9 |
| C4 | 1.0 | 0.0 | 4 | 9 | WNC[1] |
| C5 | 1.0 | 1.25 | 4 | 8 | WNC[1] |

[1]Will not accept charge, therefore not antistatic.

The results in Table 8 show that a loss of antistatic properties was obtained when a nonionic antistat was used in combination with a repellent.

Examples 10–19 and Comparative Examples C7–C17

Antistats 16–19 and 22 along with 1 or 1.25 weight % Fluorochemical Repellent FR-1, FR-2, FR-3, or FR-4 were incorporated into polypropylene melt blown fibers, which were processed into nonwoven fabrics according to the melt-blown extrusion procedure described in U.S. Pat. No. 5,300,357 (Gardiner), column 10, the description of which is incorporated herein by reference. For comparison, polypropylene melt blown fibers without repellent or antistat, and with an Antistat but without a repellent were made and formed into nonwoven fabrics by essentially the same process. For additional comparison, polypropylene melt blown fibers with only Fluorochemical Repellents FR-1, FR-2, FR-3, or FR-4 were made and processed into nonwoven fabrics by essentially the same process. The extruder used was a Brabender 42 mm conical twin screw extruder, with maximum extrusion temperature of 270–280° C. and distance to the collector of 12 inches (30 cm).

Antistat, Fluorochemical Repellent, and Escorene™ PP3505 polypropylene were mixed by blending in a paperboard container using a mixer head affixed to a hand drill for about one minute until a visually homogeneous mixture is obtained. The Antistat and Fluorochemical Repellent were dispersed in the molten polypropylene by mixing in the melt extrusion apparatus just prior to melt blowing. Except as noted, the weight percent of the compound in the polypropylene was about 1%.

The process condition for each mixture was the same, including the melt blowing die construction used to blow the microfiber web, the basis weight of the web (50±5 g/m$^2$) and the diameter of the microfibers (5–18 micrometers). Unless otherwise stated, the extrusion temperature was 270–280° C., the primary air temperature was 270° C., the pressure was 124 kPa (18 psi), with a 0.076 cm air gap width, and the polymer throughput rate was about 180 g/hr/cm.

The resulting melt blown polypropylene fabrics were evaluated for antistatic performance, oil repellency, and water repellency using Test Methods III, V, and VI. The results are shown in Tables 9 and 10.

TABLE 9

Static Charge Dissipation, Oil Repellency, and Water Repellency of Escorene ™ PP3505 Polypropylene Nonwovens

| Ex. No. | Repellent (Wt %) | Antistat (Wt %) | Repellency O | Repellency W | Charge (Kvolts) 10% RH | Charge (Kvolts) 25% RH | Charge (Kvolts) 50% RH | Static Decay (sec) 10% RH | Static Decay (sec) 25% RH | Static Decay (sec) 50% RH |
|---|---|---|---|---|---|---|---|---|---|---|
| C6 | None | None | 0 | 2 | 43 | 5+ | 5+ | 60+ | 60 | 60 |
|  |  |  |  |  |  | 1.7 | 1.7 |  | >10 | >10 |
|  |  |  |  |  |  | 5 | 5 |  | >10 | >10 |
| C7 | FR-1 1% | None | 1 | 8 | WNC | WNC | WNC | WNC | WNC | WNC |
| C8 | FR-2 1% | None | 0 | 7 | NR | NR | NR | NR | NR | NR |
| C9 | FR-3 1.25% | None | 0 | 7 | NR | NR | −.5 | NR | NR | >10 |
| C10 | FR-4 1% | None | 1 | 7 | NR | NR | −.75 | NR | NR | >10 |

RH = relative humidity
WNC = will not accept charge (therefore not antistatic)
NR = not run
O = oil
W = water The results in Table 9 show that polypropylene nonwoven alone lacked oil and water repellency and antistatic properties, and that the addition of fluorochemical repellents significantly increased repellency, particularly the water repellency of polypropylene, but made no contribution to improvement of antistatic properties.

TABLE 10

Static Charge Dissipation, Oil Repellency, and Water Repellency of
Escorene ™ PP3505 Polypropylene Nonwovens

| | | | Repellency | | Charge (Kvolts) | | | Static Decay (sec) | | |
|---|---|---|---|---|---|---|---|---|---|---|
| Ex. | Repellent | Antistat | | | 10% | 25% | 50% | 10% | 25% | 50% |
| No. | (Wt %) | (Wt %) | O | W | RH | RH | RH | RH | RH | RH |
| C12 | None | Antistat 22 (1%) | 0 | 2 | 5+ | 3.4 | 5+ | 0.86 | 0.14 | 0.03 |
| 10 | FR-1 (1%) | Antistat 22 (1%) | 2 | 9 | 5 | 5 | 5 | 0.6 | 0.3 | 0.03 |
| 11 | FR-2 (1%) | Antistat 22 (1%) | 1 | 7 | 5 | 5 | 4 | 0.7 | 0.3 | 0.05 |
| 12 | FR-4 (1%) | Antistat 22 (1%) | 1 | 5 | 5 | 5 | 4 | 1.3 | 1.1 | 0.4 |
| C13 | None | Antistat 16 (1%) | 0 | 2 | 5+ | 5+ | 5+ | 0.14 | 0.19 | 0.63 |
| 13 | FR-1 (1%) | Antistat 16 (1%) | 1.5 | 9 | 5 | 5 | 5 | 0.5 | 0.2 | 0.2 |
| 14 | FR-3 (1.25%) | Antistat 16 (1%) | 1 | 7 | 4 | 4.7 | 4.5 | 0.1 | 0.09 | 0.1 |
| 15 | FR-4 (1%) | Antistat 16 (1%) | 0 | 5 | 4 | 4.5 | 4.7 | 0.6 | 0.2 | 2.8 |
| C14 | None | Antistat 16 (0.5%) | 0 | 2 | NR | 5 | 5 | NR | >10 | 0.95 |
| 16 | FR-1 (1%) | Antistat 16 (0.5%) | 1 | 7 | 5 | 5 | 5 | 0.5 | 0.2 | 0.2 |
| C15 | None | Antistat 17 (1%) | 0.5 | 2 | 5 | 5 | 5 | 0.90 | 0.02 | 0.02 |
| 17 | FR-1 (1%) | Antistat 17 (1%) | 1 | 8 | 4.2 | 4.6 | 5 | 8.8 | 7.3 | 1.4 |
| C16 | None | Antistat 18 (1%) | 0 | 2 | 5 | 5 | 5 | 4.17 | 0.09 | 0.03 |
| 18 | FR-1 (1%) | Antistat 18 (1%) | 2 | 9 | 5 | 5 | 5 | 0.2 | 0.1 | 0.04 |
| C17 | None | Antistat 19 (1%) | 0 | 2 | NR | NR | 5 | NR | NR | >10 |
| 19 | FR-1 (1%) | Antistat 19 (1%) | 2 | 9 | 5 | 5 | 5 | 0.3 | 0.1 | 0.2 |

RH = relative humidity
NR = not run
O = oil
W = water

The results in Table 10 together with those in Table 9 show that the presence of a combination of a fluorochemical repellent and an octyldimethyl-2-hydroxyethylammonium antistat produced excellent antistatic properties with repellency essentially the same as when repellent was used alone, and, in some cases, improved the antistatic properties compared with those found when the antistat was used alone.

Examples 20–26 and Comparative Examples C18–C23

Antistats 1–4, 20, and 21 alone and in combination with 1 or 1.25 weight % Fluorochemical Repellent FR-1 or FR-3 were incorporated into polypropylene melt blown fibers and processed into nonwoven fabrics essentially as in Examples 10–19 and Comparative Examples C12–C17. The resulting melt blown polypropylene fabrics were evaluated for antistatic performance, oil repellency, and water repellency using Test Methods III, V, and VI. The results are shown in Table 11.

TABLE 11

Static Charge Dissipation, Oil Repellency, and Water Repellency of
Escorene ™ PP3505 Polypropylene Nonwovens

| | | | Repellency | | Charge (Kvolts) | | | Decay Rate (sec) | | |
|---|---|---|---|---|---|---|---|---|---|---|
| Ex. | Repellent | Antistat | | | 10% | 25% | 50% | 10% | 25% | 50% |
| No. | (Wt %) | (Wt %) | O | W | RH | RH | RH | RH | RH | RH |
| C18 | None | Antistat 20 (1%) | 0 | 2 | NR | 5+ | 5+ | NR | >60 | >60 |
| 20 | FR-1 (1%) | Antistat 20 (1%) | 1 | 8 | 5+ | 5+ | 5+ | 0.01 | 0.03 | 0.9 |

TABLE 11-continued

Static Charge Dissipation, Oil Repellency, and Water Repellency of
Escorene ™ PP3505 Polypropylene Nonwovens

| Ex. No. | Repellent (Wt %) | Antistat (Wt %) | Repellency O | W | Charge (Kvolts) 10% RH | 25% RH | 50% RH | Decay Rate (sec) 10% RH | 25% RH | 50% RH |
|---|---|---|---|---|---|---|---|---|---|---|
| 21 | FR-3 (1.25%) | Antistat 20 (1%) | 1 | 8 | NR | 5+ | 4.4 | NR | 0.02 | 0.06 |
| C19 | None | Antistat 21 (1%) | 0 | 2 | NR | 4.8 | 5+ | NR | 56 | >60 |
| 22 | FR-1 (1%) | Antistat 21 (1%) | 1.5 | 9 | NR | 5+ | 5+ | NR | >60 | 0.9 |
| C20 | None | Antistat 1 (1%) | 0 | 2 | 5 | 5 | 5 | 0.03 | 0.03 | 0.02 |
| 23 | FR-1 (1%) | Antistat 1 (1%) | 1 | 9 | NR | 2.5 | 2.5 | NR | >10 | 0.01 |
| C21 | None | Antistat 2 (1%) | 0 | 2 | NR | NR | 5 | NR | NR | >10 |
| 24 | FR-1 (1%) | Antistat 2 (1%) | 2 | 9 | NR | NR | −1.5 | NR | NR | >10 |
| C22 | None | Antistat 3 (1%) | 0 | 2 | NR | NR | 5 | NR | NR | >10 |
| 25 | FR-1 (1%) | Antistat 3 (1%) | 2 | 9 | NR | 0.7 | 1.5 | NR | >10 | 0.01 |
| C23 | None | Antistat 4 (1%) | 0 | 2 | NR | 3.7 | 3.6 | NR | 60 | 60 |
| 26 | FR-1 (1%) | Antistat 4 (1%) | 1 | 8 | NR | 4 | 4.2 | NR | 2.8 | 11 |

RH = relative humidity
NR = not run
O = oil
W = water

The results in Table 11 together with those in Table 9 show that the combination of fluorochemical repellent and an alkyl ammonium antistat provided essentially the same or better repellency compared with the repellency obtained when the repellent was used alone. Furthermore, the combination of fluorochemical repellent and antistat often provided significantly improved antistatic properties.

Examples 27–34 and Comparative Examples C24–C28

Antistats 5–9 alone and in combination with 1 or 1.25 weight % Fluorochemical Repellent FR-1 or FR-3 were incorporated into polypropylene melt blown fibers and processed into nonwoven fabrics essentially as in Examples 10–19 and Comparative Examples C12–C17. The resulting melt blown polypropylene fabrics were evaluated for antistatic performance, oil repellency, and water repellency using Test Methods III, V, and VI. The results are shown in Table 12.

TABLE 12

Static Charge Dissipation, Oil Repellency, and Water Repellency of
Escorene ™ PP3505 Polypropylene Nonwovens

| Ex. No. | Repellent (Wt %) | Antistat (Wt %) | Repellency O | W | Charge (Kvolts) 10% RH | 25% RH | 50% RH | Static Decay (sec) 10% RH | 25% RH | 50% RH |
|---|---|---|---|---|---|---|---|---|---|---|
| C24 | None | Antistat 5 (1%) | 0 | 2 | 4.8 | 4.7 | 5+ | 34 | 8.9 | 45 |
| 27 | FR-1 (1%) | Antistat 5 (1%) | 1 | 6 | 5+ | 5+ | 5+ | 1.3 | 0.7 | 1.1 |
| 28 | FR-3 (1.25%) | Antistat 5 (1%) | 0.5 | 6 | 5+ | 5+ | 5+ | 0.4 | 1.3 | 0.6 |
| C25 | None | Antistat 6 (1%) | 0 | 2 | NR | 5+ | 5+ | NR | 56 | 1.01 |
| 29 | FR-1 (1%) | Antistat 6 (1%) | 1 | 7 | NR | 2.7 | 4.7 | NR | 5 | 21 |
| 30 | FR-3 (1.25%) | Antistat 6 (1%) | 1 | 6 | NR | 1.3 | 4.2 | NR | 0.01 | 33 |
| C26 | None | Antistat 7 (1%) | 0 | 2 | NR | 3.6 | 5+ | NR | >60 | 3.98 |
| 31 | FR-1 (1%) | Antistat 7 (1%) | 1 | 7 | NR | 4.3 | 5+ | NR | >60 | 9.9 |

TABLE 12-continued

Static Charge Dissipation, Oil Repellency, and Water Repellency of
Escorene ™ PP3505 Polypropylene Nonwovens

| Ex. No. | Repellent (Wt %) | Antistat (Wt %) | Repellency O | Repellency W | Charge (Kvolts) 10% RH | Charge (Kvolts) 25% RH | Charge (Kvolts) 50% RH | Static Decay (sec) 10% RH | Static Decay (sec) 25% RH | Static Decay (sec) 50% RH |
|---|---|---|---|---|---|---|---|---|---|---|
| 32 | FR-3 (1.25%) | Antistat 7 (1%) | 1 | 6 | NR | 4.2 | 5+ | NR | 36 | 9.9 |
| C27 | None | Antistat 8 (1%) | 0 | 2 | NR | 5+ | 4.3 | NR | 49 | 0.06 |
| 33 | FR-1 (1%) | Antistat 8 (1%) | 1.5 | 9 | NR | 5+ | 5+ | NR | >60 | 1.5 |
| C28 | None | Antistat 9 (1%) | 0 | 2 | NR | 5+ | 5+ | NR | >60 | 0.46 |
| 34 | FR-1 (1%) | Antistat 9 (1%) | 2 | 10 | NR | 5+ | 5+ | NR | >60 | 0.5 |

RH = relative humidity
NR = not run
O = oil
W = water

The results in Table 12 together with those in Table 9 show that the combination of fluorochemical repellent and alkyl pyridinium anti stat provided essentially the same or better repellency compared with the repellency found when the repellent was used alone. Furthermore, the combination of repellent and antistatic compound provided significantly improved antistatic properties in some instances.

Examples 35–38 and Comparative Examples C29–C32

Antistats 10–14 alone and in combination with 1 weight % Fluorochemical Repellent FR-1 were incorporated into polypropylene melt blown fibers and processed into nonwoven fabrics essentially as in Examples 10–19 and Comparative Examples C12–C17. The resulting melt blown polypropylene fabrics were evaluated for antistatic performance, oil repellency, and water repellency using Test Methods III, V, and VI. The results are shown in Table 13.

TABLE 13

Static Charge Dissipation, Oil Repellency, and Water Repellency of
Escorene ™ PP3505 Polypropylene Nonwovens

| Ex. No. | Repellent (Wt %) | Antistat (Wt %) | Repellency O | Repellency W | Charge (Kvolts) 10% RH | Charge (Kvolts) 25% RH | Charge (Kvolts) 50% RH | Decay Rate (sec) 10% RH | Decay Rate (sec) 25% RH | Decay Rate (sec) 50% RH |
|---|---|---|---|---|---|---|---|---|---|---|
| C29 | None | Antistat 10 (1%) | 0 | 2 | 4.1 | 3.9 | 3.4 | 60+ | 0.01 | 53 |
| 35 | FR-1 (1%) | Antistat 10 (1%) | 2 | 8 | 4.7 | 5 | 5+ | 0.01 | 0.02 | 0.03 |
| C30 | None | Antistat 11 (1%) | 0 | 2 | 5+ | 5+ | 5+ | 0.02 | 20 | 0.03 |
| 36 | FR-1 (1%) | Antistat 11 (1%) | 1.5 | 8 | 5+ | 5+ | 5+ | 0.7 | 0.04 | 0.03 |
| C31 | None | Antistat 13 (1%) | 0 | 2 | 4.5 | 4.9 | 4.2 | >60 | >60 | >60 |
| 37 | FR-1 (1%) | Antistat 13 (1%) | 1 | 8 | 4.5 | 5+ | 5+ | 0.10 | 0.02 | 0.10 |
| C32 | None | Antistat 14 (1%) | 0 | 2 | NR | 3.8 | 4.4 | NR | >60 | >60 |
| 38 | FR-1 (1%) | Antistat 14 (1%) | 1 | 8 | 4 | 3.7 | 3.6 | 1.8 | 0.02 | 0.01 |

RH = relative humidity
NR = not run
O = oil
W = water

The results in Table 13 together with those in Table 9 show that the combination of repellent and imidazolium antistat provided essentially the same or better repellency compared with the repellency found when the repellent was used alone. Furthermore, the combination of repellent and antistat provided significantly improved antistatic properties.

Example 39 and Comparative Example C33

Antistat 24 alone and in combination with 1 weight % Fluorochemical Repellent FR-1 was incorporated into polypropylene melt blown fibers and processed into nonwoven fabrics essentially as in Examples 10–19 and Comparative Examples C12–C17. The resulting melt blown polypropylene fabrics were evaluated for antistatic performance, oil repellency, and water repellency using Test Methods III, V, and VI. The results are shown in Table 14.

TABLE 14

Static Charge Dissipation, Oil Repellency, and Water Repellency of Escorene ™ PP3505 Polypropylene Nonwovens

| Ex. No. | Repellent (Wt %) | Antistat (Wt %) | Repellency O | Repellency W | Charge (Kvolts) 10% RH | Charge (Kvolts) 25% RH | Charge (Kvolts) 50% RH | Decay Rate (sec) 10% RH | Decay Rate (sec) 25% RH | Decay Rate (sec) 50% RH |
|---|---|---|---|---|---|---|---|---|---|---|
| C33 | None | Antistat 24 (1%) | 0 | 2 | NR | 5+ | 5+ | NR | 25 | 12 |
| 39 | FR-1 (1%) | Antistat 24 (1%) | 3 | 9 | 5 | 4.9 | 4.3 | 0.5 | 0.4 | 0.6 |

O = oil
W = water
RH = relative humidity
NR = not run

The results in Table 14 together with those in Table 9 show that the combination of repellent and phosphonium antistat provided essentially the same or better repellency compared with the repellency found when the repellent was used alone. Furthermore, the combination of repellent and antistat provided significantly improved antistatic properties.

Example 40 and Comparative Example C34

Lithium perfluorobutanesulfonate alone and in combination with 1 weight % Fluorochemical Repellent FR-1 was incorporated into polypropylene melt blown fibers and processed into nonwoven fabrics essentially as in Examples 10–19 and Comparative Examples C12–C17. The resulting melt blown polypropylene fabrics were evaluated for antistatic performance, oil repellency, and water repellency using Test Methods III, V, and VI. The results are shown in Table 15.

The results in Table 15 together with those in Table 9 show that the combination of repellent and lithium perfluorobutanesulfonate antistat provided essentially the same repellency as that found when the repellent was used alone. Furthermore, the combination of repellent and antistat provided essentially the same antistatic properties as that found when the antistat was used alone.

Comparative Examples C35–C43

Aluminum stearate, lithium stearate, and glycerol monostearate in combination with 1 weight % Fluorochemical Repellent FR-1, FR-2, or FR-4 was incorporated into polypropylene melt blown fibers and processed into nonwoven fabrics essentially as in Examples 10–19 and Comparative Examples C12–C17. The resulting melt blown polypropylene fabrics were evaluated for antistatic performance, oil repellency, and water repellency using Test Methods III, V, and VI. The results are shown in Table 16.

TABLE 15

Static Charge Dissipation, Oil Repellency, and Water Repellency of Escorene ™ PP3505 Polypropylene Nonwoven

| Ex. No. | Repellent (Wt %) | Antistat (Wt %) | Repellency O | Repellency W | Charge (Kvolts) 10% RH | Charge (Kvolts) 25% RH | Charge (Kvolts) 50% RH | Decay Rate (sec) 10% RH | Decay Rate (sec) 25% RH | Decay Rate (sec) 50% RH |
|---|---|---|---|---|---|---|---|---|---|---|
| C34 | None | Li+—OSO$_2$C$_4$F$_9$ | 0 | 2 | NR | NR | 5 | NR | NR | 0 |
| 40 | FR-1 | Li+—OSO$_2$C$_4$F$_9$ | 1 | 6 | NR | NR | 5 | NR | NR | 0.03 |

O = oil
W = water
RH = relative humidity
NR = not run

TABLE 16

Static Charge Dissipation, Oil Repellency, and Water Repellency of
Escorene ™ PP3505 Polypropylene Nonwoven

| Ex. No. | Repellent (Wt %) | Antistat (Wt %) | Repellency O | Repellency W | Charge (Kvolts) 25% RH | Charge (Kvolts) 50% RH | Decay Rate (sec) 25% RH | Decay Rate (sec) 50% RH |
|---|---|---|---|---|---|---|---|---|
| C35 | FR-1 (1%) | $AlOCO(CH_2)_{16}CH_3$ (1%) | 0 | 9 | NR | −1 | NR | >10 |
| C36 | FR-1 (1%) | $LiOCO(CH_2)_{16}CH_3$ (1%) | 1 | 9 | NR | 2.4 | NR | >10 |
| C37 | FR-1 (1%) | HOCH2CH(OH)CH2O—$CO(CH_2)_{16}CH_3$ (1%) | 1 | 9 | 1.2 | 0.9 | 0 | >10 |
| C38 | FR-2 (1%) | $AlOCO(CH_2)_{16}CH_3$ (1%) | 2 | 8 | NR | 2 | NR | >10 |
| C39 | FR-2 (1%) | $LiOCO(CH_2)_{16}CH_3$ (1%) | 1 | 8 | NR | −0.5 | NR | >10 |
| C40 | FR-2 (1%) | HOCH2CH(OH)CH2O—$CO(CH_2)_{16}CH_3$ (1%) | 0 | 5 | NR | 2 | NR | >10 |
| C41 | FR-4 (1%) | $AlOCO(CH_2)_{16}CH_3$ (1%) | 1 | 9 | NR | 0.5 | NR | >10 |
| C42 | FR-4 (1%) | $LiOCO(CH_2)_{16}CH_3$ (1%) | 2 | 6 | NR | −0.9 | NR | >10 |
| C43 | FR-4 (1%) | HOCH2CH(OH)CH2O—$CO(CH_2)_{16}CH_3$ (1%) | 2 | 8 | NR | 2.2 | NR | >10 |

RH = relative humidity
NR = not run
O = oil
W = water

The results in Table 16 show that neither the nonionic antistatic compounds nor the ionic antistatic compounds (that lack an anion for which the conjugate acid is a strong acid) provided antistatic properties in combination with fluorochemical repellents.

Example 41 and Comparative Examples C44–C46

Antistat 16, $C_8H_{17}N^+(CH_3)_2C_2H_4OH$ $^-N(SO_2CF_3)_2$ (2 weight %) and Fluorochemical Repellent FR-1 (2 weight %) were incorporated into MORTHANE™ PS440-200 urethane melt blown fibers, which were made and processed into a nonwoven fabric essentially as described in Examples 10–19, except that the extrusion temperature was 230° C. For comparisons, MORTHANE™ PS440-200 urethane melt blown fibers without antistat or repellent, with Antistat 16 (2 weight %) alone, and with Fluorochemical Repellent FR-1 (2 weight %) alone were made and processed into nonwoven fabrics essentially as described in Comparative Examples C7–C17. The resulting fabrics were tested for antistatic performance, oil repellency, and water repellency, using Test Methods III, V, and VI. The results are shown in Table 17.

TABLE 17

Static Charge Dissipation, Oil Repellency, and Water Repellency of
Melt Blown MORTHANE ™ PS440-200 Urethane Nonwoven Fabrics

| Ex. No. | Repellent (Wt %) | Antistat (Wt %) | Repellency O | Repellency W | Charge (Kvolts) 10% RH | Charge (Kvolts) 25% RH | Charge (Kvolts) 50% RH | Decay Rate (sec) 10% RH | Decay Rate (sec) 25% RH | Decay Rate (sec) 50% RH |
|---|---|---|---|---|---|---|---|---|---|---|
| C44 | None | None | 0 | 2 | NR | 5 | 5 | NR | >60 | >60 |
| C45 | None | Antistat 16 (2%) | 0 | 2 | 5 | 5 | 5 | 0.09 | 0.08 | 0.08 |
| C46 | FR-1 (2%) | None | 6 | 4 | 5 | 5 | 5 | 4.20 | 3.34 | 2.4 |
| 41 | FR-1 (2%) | Antistat 16 (2%) | 6 | 7 | 5 | 5 | 5 | 0.08 | 0.06 | 0.07 |

RH = relative humidity
NR = not run
O = oil
W = water

The results in Table 17 show that the combination of fluorochemical repellent and ionic antistat provided both very good repellency and good antistatic properties in polyurethane nonwoven fabric.

Example 42 and Comparative Example C47–49

Antistat 16 (1 weight %) and Fluorochemnical Repellent FR-1 (1 weight %) were incorporated into ASPUN™ 6806 poly(ethylene/octene) melt blown fibers, which were made and processed into a nonwoven fabric essentially as described in Examples 10–19, except that the extrusion temperature was 240° C. For comparisons, ASPUN™ 6806 melt blown fibers without any antistat or repellent, with Antistat 16 (1 weight %) alone, and with Fluorochemical Repellent FR-1 (1 weight %) alone were made and processed into nonwoven fabrics essentially as described in Comparative Examples C7–C17. The resulting fabrics were tested for antistatic performance, oil repellency, and water repellency, using Test Methods III, V, and VI. The results are shown in Table 18.

Examples 43–45 and Comparative Example 50

Polypropylene films containing tetrabutylphosphonium perfluorobutanesulfonate (Antistat 24) and Fluorochemical Repellent FR-1, FR-3, or FR-4 were prepared and evaluated for repellency and antistatic performance. For comparison, a polypropylene film without antistat or repellent was essentially identically prepared and evaluated. The melt-blown nonwoven fabrics of Example 39, and Comparative Example 7, as well as nonwoven fabrics made essentially identically to Example 39 but with FR-3 and FR-4 substituted for FR-1 were pressed into films as follows: About 3.4 g of the folded melt-blown fabric was placed on a steel plate within the perimeter of an 11.2 cm by 17.1 cm by 0.177 mm thick shim and covered with another steel plate. This assembly was then placed on a platen press heated to 200° C., with the platens nearly touching, for about 30 seconds to pre-melt the fabric and allow for escape of air before pressing. Next, the construction was placed under 0.91 metric ton of pressure for about one minute. The assembly was removed from the press and allowed to cool for about 30 seconds between

TABLE 18

Static Charge Dissipation, Oil Repellency, and Water Repellency of Melt Blown ASPUN ™ 6806 Poly(ethylene/octene) Nonwoven Fabrics

| | | | | | Charge (Kvolts) | | | Decay Rate (sec) | | |
|---|---|---|---|---|---|---|---|---|---|---|
| | | | Repellency | | 10% | 25% | 50% | 10% | 25% | 50% |
| Ex. No. | Repellent (Wt %) | Antistat (Wt %) | O | W | RH | RH | RH | RH | RH | RH |
| C47 | None | None | 0 | 2 | NR | NR | 3 | NR | NR | >60 |
| C48 | None | Antistat 16 (1%) | 0 | 2 | 5 | 5 | 5 | 0.07 | 0.08 | 0.07 |
| C49 | FR-1 (1%) | None | 3 | 9 | NR | 1.7 | 3 | NR | 0.00 | 7.68 |
| 42 | FR-1 (1%) | Antistat 16 (1%) | 6 | 7 | 5 | 5 | 5 | 0.02 | 0.01 | 0.01 |

RH = relative humidity
NR = not run
O = oil
W = water

The results in Table 18 show that the combination of fluorochemical repellent and ionic antistat provided both very good repellency and excellent antistatic properties in poly(ethylene/octene) nonwoven fabric.

two unheated platens. The formed film was then removed from the shim and steel plates.

The resulting films were evaluated for antistatic performance, oil repellency, and water repellency using Test Methods III, V, and VI. The results are shown in Table 19.

TABLE 19

Static Charge Dissipation, Oil Repellency, and Water Repellency of Escorene ™ PP3505 Polypropylene Films

| | | | | | Charge (Kvolts) | | | Decay Rate (sec) | | |
|---|---|---|---|---|---|---|---|---|---|---|
| | | | Repellency | | 10% | 25% | 50% | 10% | 25% | 50% |
| Ex. No. | Repellent (Wt %) | Antistat (Wt %) | O | W | RH | RH | RH | RH | RH | RH |
| C50 | None | None | 0 | 4 | NR | NR | 1.5 | NR | NR | >10 |
| 43 | FR-1 (1%) | Antistat 24 (1%) | 2 | 10 | NR | 5 | 5 | NR | >10 | 1.3 |
| 44 | FR-3 (1%) | Antistat 24 (1%) | 1 | 8 | 5 | 5 | 4.3 | >10 | 2.1 | 0.7 |
| 45 | FR-4 (1%) | Antistat 24 (1%) | 1 | 4 | 5 | 5 | 4.2 | 4.4 | 1.6 | 0.02 |

RH = relative humidity
NR = not run
O = oil
W = water

The results in Table 19 show that the combination of fluorochemical repellent and phosphonium antistat provided both good repellency and good antistatic properties in polypropylene films.

Examples 46–49 and Comparative Examples C51–56

A polypropylene nonwoven fabric, having a basis weight of 220 grams/m$^2$, was made essentially as Comparative Example 7, but using Montell™ H442PP (polypropylene) with the collector speed adjusted for this basis weight. The resulting fabric was tested for oil repellency, water repellency, and antistatic performance (Test Methods V, VI, and III) before and after topical treatment with a repellent, various ionic antistats, and combinations of the repellent and antistats. Pad bath solutions (500 grams) made up of 80 weight % water and 20 weight % isopropanol (IPA) without and with 0.366 weight % repellent (9.15 grams of 20 weight % solids FC-808 diluted to 500 grams with the 80/20 water IPA), with 0.366 weight % antistat, and with combinations of 0.366 weight % repellent and 0.366 weight % antistat were prepared. A weighed (4–6 grams) piece of nonwoven fabric was dipped in each pad bath and passed between two 12.7 cm rubber rolls at a pressure of 0.41 MPa and a speed of 7.6 m/min. The wet fabric was weighed and then dried in a forced air oven at 149° C. for five minutes. The target amount of repellent and antistat applied to the fabric was 0.55 weight %. The actual amount ranged from 0.51 to 0.64%. Repellency and antistatic properties of the topically treated nonwoven fabric are shown in Table 20.

The results in Table 20 show that surprising and excellent antistatic and repellency properties were obtained by topically treating a nonwoven with a composition comprising an antistat and a fluorochemical repellent.

EXAMPLE 50 AND COMPARATIVE EXAMPLES C57–C59

A thermoset epoxy coating was prepared by mixing 5 grams part A (amine part) and 6 grams part B (epoxy part) of Scotchweld™ 1838-iB/A Translucent Epoxy Adhesive (available from 3M, St. Paul Minn.). The mixture was poured at the top of a 25.5 cm by 15.5 cm by 0.102 mm thick primed polyester terephthalate film and then drawn over the film using a No. 12 wire wound (Meyer) bar. The resulting coating was cured at 65° C. for one hour in a forced air oven. The above procedure was repeated using separate 5 gram quantities of part A containing 0.33 gram 1-ethyl-3-methylimidazolium bis(trifluoromethylsulfonyl)imide (Antistat 10), 0.33 gram Fluorochemical Repellent FR-3, and a combination of 0.33 gram 1-ethyl-3-methylimidazolium bis(trifluoromethylsulfonyl)imide and 0.33 gram Fluorochemical Repellent FR-3, respectively. The cured coatings were tested for antistatic performance, oil repellency, and water repellency using Test Methods III, V, and VI. The results are shown in Table 21.

TABLE 20

Static Charge Dissipation, Oil Repellency, and Water Repellency of Topically Treated Polypropylene Nonwovens

| Ex. No. | Repellent (Wt %) | Antistat (Wt %) | Repellency O | Repellency W | Charge (Kvolts) 10% RH | Charge (Kvolts) 25% RH | Charge (Kvolts) 50% RH | Decay Rate (sec) 10% RH | Decay Rate (sec) 25% RH | Decay Rate (sec) 50% RH |
|---|---|---|---|---|---|---|---|---|---|---|
| C51 | None | None | 0 | 2 | 5 | 4.3 | 2.2 | >10 | >10 | >10 |
| C52 | FC-808 (0.54%) | None | 6 | 10 | 5 | NR | 5 | >10 | NR | 2.1 |
| C53 | None | Antistat 22 (0.56%) | 0 | 1 | 5 | 5 | 5 | 1.1 | 1.3 | 0.15 |
| 46 | FC-808 (0.51%) | Antistat 22 (0.51%) | 7 | 10 | 5 | 5 | 5 | .02 | .03 | .01 |
| C54 | None | Antistat 23 (0.55%) | 0 | 0 | 5 | 5 | 5 | 0.01 | 0.04 | 0.01 |
| 47 | FC-808 (0.53–0.64%) | Antistat 23 (0.53–0.64%) | 6 | 10 | 5 | 5 | 5 | 0.01 | 0.07 | 0.01 |
| C55 | None | Sodium p-Toluenesulfonate (0.55%) | 0 | 2 | NR | NR | 3.5 | NR | NR | >10 |
| 48 | FC-808 (0.51%) | Sodium p-Toluenesulfonate (0.51%) | 6 | 10 | 5 | 5 | 5 | 1.5 | 2.0 | 0.1 |
| C56 | None | Antistat 16 (0.52%) | 0 | 1 | 5 | 5 | 5 | 2.1 | 2.9 | 1.4 |
| 49 | FC-808 (0.51–0.53%) | Antistat 16 (0.51–0.53%) | 8 | 10 | 5 | 5 | 5 | 0.01 | 0.01 | 0.01 |

RH = relative humidity
NR = not run
O = oil
W = water

TABLE 21

Static Charge Dissipation, Oil Repellency, and Water Repellency of Thermoset Epoxy Coatings

| Ex. No. | Repellent (Wt %) | Antistat (Wt %) | Repellency O | Repellency W | Charge (Kvolts) 50% RH | Decay Rate (sec) 50% RH |
|---|---|---|---|---|---|---|
| C57 | None | None | 1 | 6 | 5 | >60 |
| C58 | None | Antistat 10 (2.9%) | 1 | 3 | 5 | 24 |
| C59 | FR-3 (2.9%) | None | 8 | 10 | 5 | >60 |
| 50 | FR-3 (2.9%) | Antistat 10 (2.9%) | 8 | 10 | 5 | 9.6 |

RH = relative humidity
O = oil
W = water

The results in Table 21 show that high oil and water repellency and some improvement in antistatic properties were obtained by using a combination of a fluorochemical repellent and an ionic antistat in a thermoset epoxy coating.

Example 51 and Comparative Examples C60–C62

A moisture curable polyurethane resin was prepared by combining one equivalent of LHT 28 (Union Carbide Corp., Danbury, Conn.), one equivalent of PPG 3025 (ARCO Chemical Co., Newtown Square, Pa.), and 4 equivalents of toluene diisocyanate under a dry nitrogen purge. The mixture was heated with stirring at 80° C. for 4 hours and then cooled to 60° C. A few drops of dibutyltin dilaurate was added to the mixture, and the mixture was allowed to come to room temperature.

A thermoset polyurethane coating was prepared as follows: A portion of the resulting moisture curable polyure thane resin (10 grams) was heated to about 100° C. using a heat gun. About 2 ml of the heated resin was pipetted onto the top of a 25.5 cm by 15.5 cm by 0.102 mm thick primed terephthalate polyester film, and the resin was drawn over the film using a No. 12 Meyer bar. The resulting coating was cured at 65° C. for 12 hours in a forced air oven and then allowed to stand at ambient conditions for 10 hours. The above procedure was repeated using separate 10 gram quantities of urethane resin containing 0.157 gram 1-ethyl-3-methylimidazolium bis(trifluoromethylsulfonyl)imide (Antistat 10), 0.153 gram Fluorochemical Repellent FR-3, and a combination of 0.157 gram 1-ethyl-3-methylimidazolium bis(trifluoromethylsulfonyl)imide and 0.151 gram Fluorochemical Repellent FR-3, respectively. The cured coatings were tested for antistatic performance, oil repellency, water repellency, and surface resistivity using Test Methods III, IV, V, and VI. The results are shown in Tables 22 and 23.

TABLE 22

Static Charge Dissipation, Oil Repellency, and Water Repellency of Thermoset Urethane Coatings.

| Ex. No. | Repellent (Wt %) | Antistat (Wt %) | Repellency O | Repellency W | Charge (Kvolts) 10% RH | Charge (Kvolts) 25% RH | Charge (Kvolts) 50% RH | Decay Rate (sec) 10% RH | Decay Rate (sec) 25% RH | Decay Rate (sec) 50% RH |
|---|---|---|---|---|---|---|---|---|---|---|
| C60 | None | None | 1 | 3 | 5 | 5 | 5 | 2.4 | 2.4 | 2.9 |
| C61 | None | Antistat 10 (1.5%) | 1 | 3 | 5 | 5 | 5 | 0.01 | 0.01 | 0.01 |
| C62 | FR-3 (1.5%) | None | 8 | 10 | 5 | 5 | 5 | 5.4 | 4.1 | 2.0 |
| 51 | FR-3 (1.5%) | Antistat 10 (1.5%) | 8 | 10 | 5 | 5 | 5 | 0.05 | 0.03 | 0.02 |

RH = relative humidity
O = oil
W = water

The results in Table 22 show that high oil and water repellency and excellent antistatic properties were obtained when a combination of fluorochemical repellent and ionic antistat were used in a thermoset urethane coating.

TABLE 23

Surface Resistivity of Thermoset Urethane Coatings

| Example No. | Repellent (Wt %) | Antistat (Wt %) | Surface Resistivity at 26% RH and 21.7° C. (ohms/square) |
|---|---|---|---|
| C60 | None | None | >10E12 |
| C61 | None | Antistat 10 (1.5%) | 2.67 × 10E10 |
| C62 | FR-3 (1.5%) | None | >10E12 |
| 51 | FR-3 (1.5%) | Antistat 10 (1.5%) | 1.75 × 10E10 |

RH = relative humidity
O = oil
W = water

The results in Table 23 show that an improvement in antistatic properties was obtained by using a combination of fluorochemical repellent and antistat compound in a thermoset urethane coating.

Various modifications and alterations of this invention will become apparent to those skilled in the art without departing from the scope and spirit of this invention.

What is claimed is:

1. A film comprising a composition comprising (a) at least one nonpolymeric ionic salt consisting of (i) at least one cation selected from the group consisting of monovalent metal cations, divalent metal cations, and organic onium cations and (ii) at least one weakly coordinating anion, the conjugate acid of said anion having an acidity greater than or equal to that of a hydrocarbon sulfonic acid, and with the proviso that said anion is organic or fluoroorganic when said cation is a metal; (b) at least one fluorochemical repellent; and (c) at least one insulating material selected from the group consisting of thermoplastic polymers, thermoset polymers, and reactive precursors thereof; wherein said composition is prepared by forming a blend of components (a), (b), and (c).

2. A molded or blown article comprising a composition comprising (a) at least one nonpolymeric ionic salt consisting of (i) at least one cation selected from the group consisting of monovalent metal cations, divalent metal cations, and organic onium cations and (ii) at least one weakly coordinating anion, the conjugate acid of said anion having an acidity greater than or equal to that of a hydrocarbon sulfonic acid, and with the proviso that said anion is organic or fluoroorganic when said cation is a metal; (b) at least one fluorochemical repellent; and (c) at least one insulating material selected from the group consisting of thermoplastic polymers, thermoset polymers, and reactive precursors thereof; wherein said composition is prepared by forming a blend of components (a), (b), and (c).

* * * * *

UNITED STATES PATENT AND TRADEMARK OFFICE
CERTIFICATE OF CORRECTION

PATENT NO.     : 6,784,237 B2
DATED          : August 31, 2004
INVENTOR(S)    : Thompson, Delton R. Jr.

It is certified that error appears in the above-identified patent and that said Letters Patent is hereby corrected as shown below:

<u>Title page,</u>
Item [56], References Cited, U.S. PATENT DOCUMENTS, delete "Blerbrauber" and insert -- Bierbrauber --.
FOREIGN PATENT DOCUMENTS, delete "9722660" and insert -- 97/22660 --.

<u>Column 6,</u>
Line 9, after "more" delete ".".

<u>Column 8,</u>
Line 53, delete "Nos." and insert -- No. --.

<u>Column 9,</u>
Lines 17 and 19, delete "$C_8H_{17}H^+$" and insert -- $C_8H_{17}N^+$ --.

<u>Column 10,</u>
Line 46, delete "Ch$_2$Ch$_2$OH" and insert -- CH$_2$CH$_2$OH --.
Line 48, delete "Ch$_2$OH" and insert -- CH2OH --.

<u>Column 12,</u>
Line 24, delete "acryl ate" and insert -- acrylate --.
Line 24, delete "meth acryl ate" and insert -- methacrylate --.

<u>Column 34,</u>
Line 49, after "2" delete "43" and insert -- 4.3 --.

UNITED STATES PATENT AND TRADEMARK OFFICE
CERTIFICATE OF CORRECTION

PATENT NO. : 6,784,237 B2
DATED : August 31, 2004
INVENTOR(S) : Thompson, Delton R. Jr.

It is certified that error appears in the above-identified patent and that said Letters Patent is hereby corrected as shown below:

Column 40,
Line 41, below "FR-1" insert -- 1% --.
Line 41, below "1.5" delete "1%".

Signed and Sealed this

Tenth Day of January, 2006

JON W. DUDAS
*Director of the United States Patent and Trademark Office*